United States Patent
Imamura et al.

(10) Patent No.: US 11,865,610 B2
(45) Date of Patent: Jan. 9, 2024

(54) METHOD FOR JOINING ALUMINUM MATERIAL

(71) Applicant: Kobe Steel, Ltd., Kobe (JP)

(72) Inventors: Yoshihaya Imamura, Kanagawa (JP); Chieko Imai, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 7 days.

(21) Appl. No.: 17/619,737

(22) PCT Filed: Jun. 12, 2020

(86) PCT No.: PCT/JP2020/023270
§ 371 (c)(1),
(2) Date: Dec. 16, 2021

(87) PCT Pub. No.: WO2020/255891
PCT Pub. Date: Dec. 24, 2020

(65) Prior Publication Data
US 2022/0355372 A1    Nov. 10, 2022

(30) Foreign Application Priority Data

Jun. 17, 2019 (JP) .................................. 2019-111896
Oct. 28, 2019 (JP) .................................. 2019-195190

(51) Int. Cl.
*B22D 19/04* (2006.01)
*B22D 27/09* (2006.01)
(Continued)

(52) U.S. Cl.
CPC ............. *B22D 19/04* (2013.01); *B22D 27/09* (2013.01); *B23K 20/026* (2013.01); *B23K 2103/10* (2018.08)

(58) Field of Classification Search
CPC ........ B22D 19/04; B22D 19/16; B22D 21/04; B22D 27/09
(Continued)

(56) References Cited

U.S. PATENT DOCUMENTS 3,058,181 A * 10/1962 Brick .................... B22D 11/126
428/614
3,264,696 A * 8/1966 Funk ....................... C23C 18/02
164/54
(Continued)

FOREIGN PATENT DOCUMENTS

JP      2004-243364 A    9/2004
WO   WO 2013/065160 A1   5/2013

*Primary Examiner* — Kevin P Kerns
(74) *Attorney, Agent, or Firm* — Oblon, McClelland, Maier & Neustadt, L.L.P.

(57) ABSTRACT

A method for joining an aluminum material includes, in the following order, arranging a first wrought aluminum alloy material along a first jig in an internal space defined between the first jig and a second jig that is arranged to face the first jig and has a pouring port, pouring molten aluminum toward the first wrought aluminum alloy material through the pouring port under pressure to cause the molten aluminum to collide with a surface of the first wrought aluminum alloy material, thereby digging down the first wrought aluminum alloy material at a collision position between the molten aluminum and the first wrought aluminum alloy material, and flowing the molten aluminum together with a fraction of the first wrought aluminum alloy material removed by digging within the internal space along a surface of the first wrought aluminum alloy material around the collision position.

13 Claims, 22 Drawing Sheets

(51) Int. Cl.
B23K 20/02 (2006.01)
*B23K 103/10* (2006.01)

(58) Field of Classification Search
USPC .................................. 164/98, 100, 106, 108
See application file for complete search history.

(56) References Cited

U.S. PATENT DOCUMENTS

| | | | | |
|---|---|---|---|---|
| 4,102,033 A | * | 7/1978 | Emi et al. | B22D 7/02 |
| | | | | 164/75 |
| 4,356,618 A | * | 11/1982 | Jordan | C22C 47/08 |
| | | | | 164/487 |
| 2014/0367454 A1 | | 12/2014 | Fujita et al. | |

* cited by examiner

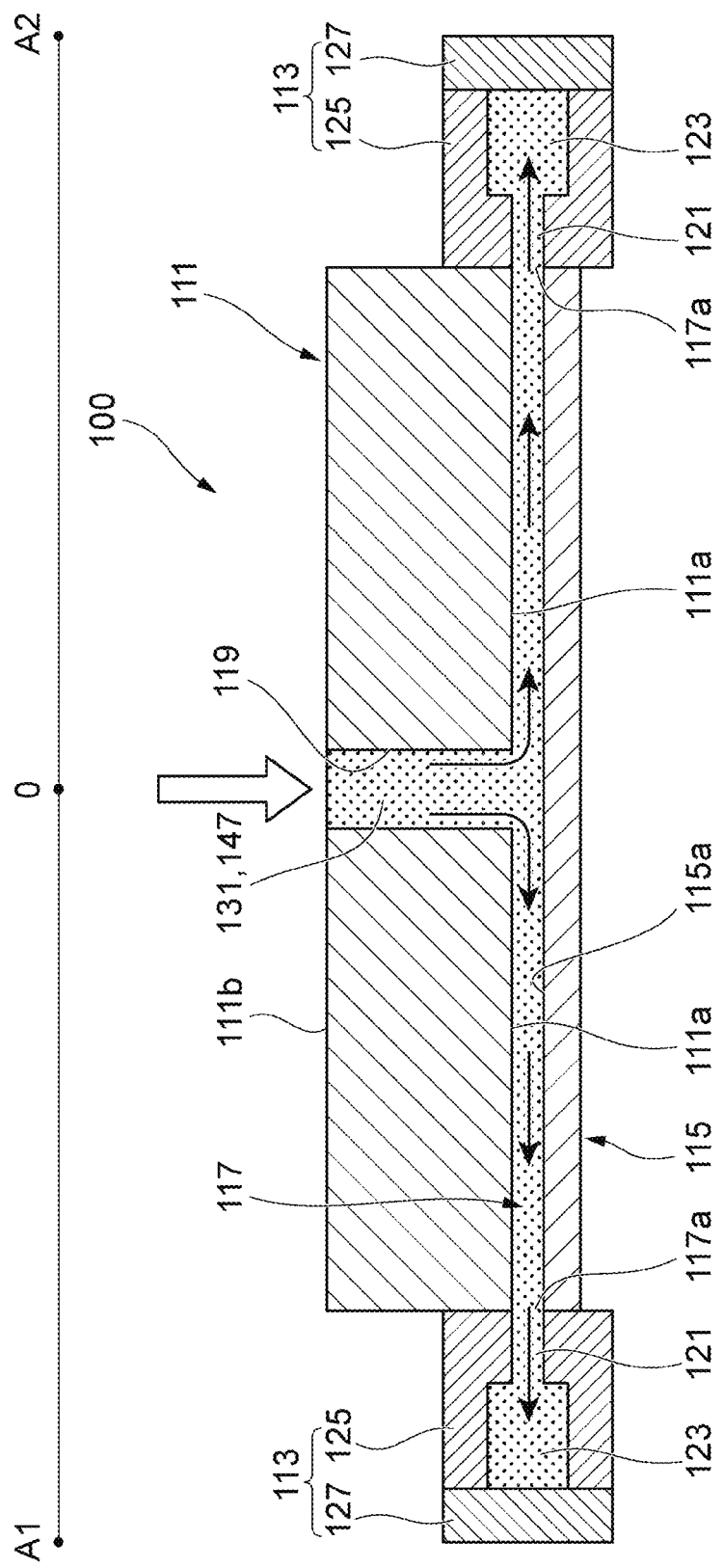

METHOD FOR JOINING ALUMINUM MATERIAL

TECHNICAL FIELD

The present invention relates to a method for joining an aluminum material.

BACKGROUND ART

As a technique of face joining a plurality of metal materials, clad rolling is exemplified. Clad rolling is a technique in which a plurality of metal materials are pressed by rolling rolls to perform compression bonding of the metal materials through hot or cold rolling. In clad rolling, an oxide film is broken due to deformation of the pressed surfaces, and accordingly, even in a case of a material in which an oxide film is easily formed on a surface thereof, e.g. an aluminum alloy, a good compression bonding surface can be obtained.

In a case where metal materials are subjected to compression bonding by clad rolling, it is necessary to increase a reduction ratio for ensuring that an oxide film is reliably broken, and it is occasionally necessary to perform rolling a plurality of times. Therefore, a technique of reducing a reduction ratio by rolling after arranging an intermediate layer between a plurality of metal materials and liquefying a part of the intermediate layer is proposed (see PTL 1).

CITATION LIST

Patent Literature

PTL 1: WO 2013/065160 A1

SUMMARY OF INVENTION

Technical Problem

These techniques only enable flat plates to be joined, and the plate-shaped joined body is inevitably obtained. Accordingly, these techniques cannot be employed for joining members having a three-dimensional shape, such as pressed products for automobile parts.

However, brazing and solid-phase diffusion bonding are considered as a technique for face joining members having various shapes without being restricted by shape. As for brazing, a brazing material must be evenly spread over the entire joining surface, which causes poor workability and also requires preparation of a dedicated brazing material or heat treatment furnace. In addition, the solid-phase diffusion bonding technique cannot be applied to a metal material on which an oxide film is easily formed, e.g. an aluminum alloy, because the oxide film blocks movement of atoms by diffusion.

Further, in recent years, application of an aluminum material as a lightweight structural material in place of a steel material is actively progressing. As for the aluminum material, there is a high demand for realizing a higher joining strength than the case of the face joining techniques described above. For example, in a case where a protrusion is provided in a joining surface, slippage on the joining surface can be prevented and a joining strength can be enhanced. However, processing becomes complicated and many problems in terms of workability and cost are involved.

Accordingly, a first object of the present invention is to provide a method for joining an aluminum material, which can enhance a joining strength without complicated processing even in a case where an aluminum material, on which an oxide film is easily formed, in a complicated three-dimensional shape is joined. In addition, a second object is to provide a method for joining an aluminum material, which gives options in shape of metal materials to be joined and can obtain a good bonding even in a case where the aluminum material has an oxide film strongly bonded thereto.

Solution to Problem

The present invention includes the following configurations.

(1) A method for joining an aluminum material, comprising, in the following order, the steps of:
  arranging a first wrought aluminum alloy material along a first jig in an internal space defined between the first jig and a second jig that is arranged to face the first jig and has a pouring port;
  pouring molten aluminum toward the first wrought aluminum alloy material through the pouring port under pressure to cause the molten aluminum to collide with a surface of the first wrought aluminum alloy material, thereby digging down the first wrought aluminum alloy material at a collision position between the molten aluminum and the first wrought aluminum alloy material; and
  flowing the molten aluminum together with a fraction of the first wrought aluminum alloy material removed by digging within the internal space along a surface of the first wrought aluminum alloy material around the collision position.

(2) A method for joining an aluminum material, comprising, in the following order, the steps of:
  arranging a first wrought aluminum alloy material along a first jig in an internal space defined between the first jig and a second jig that is arranged to face the first jig and has a pouring port, and arranging a second wrought aluminum alloy material along the second jig in the internal space such that the second wrought aluminum alloy material is spaced apart from the first wrought aluminum alloy material;
  pouring molten aluminum toward the internal space through the pouring port under pressure to form a through-hole in the second wrought aluminum alloy material;
  pouring the molten aluminum into the internal space through the through-hole under pressure to cause the molten aluminum to collide with a surface of the first wrought aluminum alloy material, thereby digging down the first wrought aluminum alloy material at a collision position between the molten aluminum and the first wrought aluminum alloy material; and
  flowing the molten aluminum together with a fraction of the first wrought aluminum alloy material removed by digging within the internal space along surfaces of the first and second wrought aluminum alloy materials around the collision position.

(3) A method for joining an aluminum material, comprising joining a metal material made of a wrought aluminum alloy material and a filler metal made of an aluminum cast, the method comprising the steps of:
  arranging the metal material in a flow path formed in a jig made of a material having a melting point higher than those of the metal material and the filler metal such that a to-be-joined surface of the metal material is exposed to the flow path;

spraying a molten metal of the filler metal into the flow path to form droplets of the filler metal;

forming a fresh surface in the to-be-joined surface by causing fine particles formed by cooling and solidifying the droplets in the flow path to collide with the to-be-joined surface;

covering the fresh surface with a molten metal of the filler metal after the fresh surface is formed and before an oxide film is formed thereon; and pressurizing the molten metal in the flow path while keeping the molten metal at a solid-phase diffusion bonding temperature, thereby solid-phase diffusion bonding the fresh surface and the filler metal.

Advantageous Effects of Invention

Thanks to the present invention, it is possible to enhance a joining strength without complicated processing even in a case where an aluminum material, on which an oxide film is easily formed, in a complicated three-dimensional shape is joined. In addition, thanks to the present invention, not only flat members, such as plate materials, but also processed aluminum materials, such as pressed products, can be joined. Accordingly, it is possible to give options, in selection of a member to be joined and also to obtain a good bonding even in a case where the aluminum material has an oxide film strongly bonded thereto.

BRIEF DESCRIPTION OF DRAWINGS

FIG. 11 is an explanatory diagram showing an aspect in which a filler metal has been supplied to a filling space, and illustrating a section of the jig taken along a line A1-O-A2 shown in FIG. 9.

DESCRIPTION OF EMBODIMENTS

Hereinafter, embodiments of the present invention are described in detail with reference to the accompanying drawings.

Figure 1:
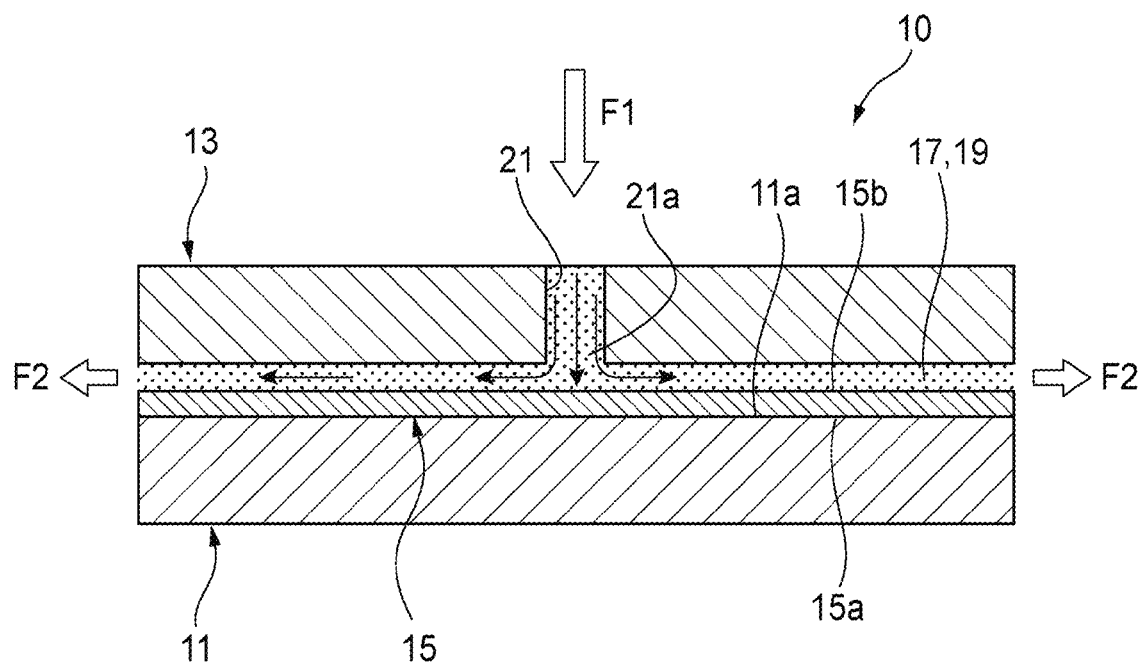
FIG. 1 is a schematic configuration view of a main part of a jig for joining an aluminum material.

FIG. 1 is a schematic configuration view of a main part of a jig 10 for joining an aluminum material.

The jig 10 includes a first jig 11 and a second jig 13, which are arranged to face each other. The first jig 11 and the second jig 13 are configured to be movable in a direction separating from each other or approaching each other by a moving mechanism (not shown). In an internal space defined between the first jig 11 and the second jig 13, a plate-shaped first wrought aluminum alloy material 15 is arranged along the first jig 11. A gap 19 is provided between the first wrought aluminum alloy material 15 and the second jig 13. The second jig 13 has a pouring port 21 communicating with the internal space.

The first jig 11 has a contact surface 11a to be in contact with one surface (outer surface) 15a of the first wrought aluminum alloy material 15 and supports the first wrought aluminum alloy material 15. The first wrought aluminum alloy material 15 may be placed on the contact surface 11a of the first jig 11 or may be fixed to the contact surface 11a using a fixing means (not shown). The gap 19 is present between the second jig 13 and the other surface (inner surface) 15b of the first wrought aluminum alloy material 15 and the second jig 13 is arranged to face the first wrought aluminum alloy material 15.

The pouring port 21 of the second jig 13 is connected to a supply source of molten aluminum 17 (not shown), and allows the molten aluminum 17 to be supplied to the gap 19. It is preferred that the pouring port 21 is formed along a direction perpendicular to the inner surface 15b of the first wrought aluminum alloy material 15 at least at an outlet 21a connected to the gap 19. In addition, an axial direction of the pouring port 21 may be inclined from the direction perpendicular to the inner surface 15b of the first wrought aluminum alloy material 15. An opening shape of the pouring port 21 may be in various shapes, such as a circle, an ellipse, a square, a rectangle and a triangle.

As shown by an arrow F1, when the molten aluminum 17 is poured into the gap 19 in the internal space through the pouring port 21, the molten aluminum 17 first collides with a surface (inner surface 15b) of the first wrought aluminum alloy material 15. Then, a flow direction of the molten aluminum 17 is changed and the molten aluminum 17 flows along the inner surface 15b of the first wrought aluminum alloy material 15.

Therefore, the gap 19 between the inner surface 15b of the first wrought aluminum alloy material and the second jig 13 is filled with the molten aluminum 17. When the molten aluminum 17 is solidified, a joined body in which the first wrought aluminum alloy material 15 and the molten aluminum 17 are integrated is obtained.

The jig 10 described above has a vertical configuration in which the first jig 11 overlaps with the second jig 13 in a vertical direction but may have a horizontal configuration in which the first jig 11 overlaps with the second jig 13 in a horizontal direction. The layout of each part of the jig 10 can be appropriately selected depending on arrangement of each of parts, such as a support mechanism for each of the first jig 11 and the second jig 13, a fixing member for fixing the first wrought aluminum alloy material 15 in a mold, a supply unit for supplying the molten aluminum to the pouring port 21, a temperature control unit for controlling a temperature of the mold and the like, which all are not shown.

As the first wrought aluminum alloy material 15, 2000 series aluminum alloy, 3000 series aluminum alloy, 4000 series aluminum alloy, 5000 series aluminum alloy, 6000 series aluminum alloy or 7000 series aluminum alloy, or 1000 series pure wrought aluminum alloy material can be employed. From a viewpoint of weldability, 5000 series aluminum alloy, 6000 series aluminum alloy or 7000 series aluminum alloy is especially preferable.

The first wrought aluminum alloy material 15 is not limited to a plate material but may be an extruded shaped material (a pipe material, or a shaped material having a hollow shape, solid shape, or irregular cross-section shape) or a forged material (a plate material or a ribbed material). In addition, the surface of the first wrought aluminum alloy material 15 may be subjected to various surface treatments, such as a blast treatment, an etching treatment or a brush polishing treatment, as a preliminary treatment. In this case, an organic substance on the surface of the first wrought aluminum alloy material 15 is removed, and a joining quality between the first wrought aluminum alloy material 15 and the aluminum cast obtained by solidifying the molten aluminum 17 is improved.

Examples of a material for the molten aluminum 17 include, for example, AC4C, AC4CH, AC2B (JIS H 5202), ADC12 (JIS H 5302) and the like. Hereinafter, wrought aluminum alloy materials, such as the first wrought aluminum alloy material 15, and the molten aluminum 17 may be called "aluminum material".

The term "internal space" used herein means a flow path which is formed by the jig 10 (first jig 11 and second jig 13) made of a material having a melting point higher than those of the first wrought aluminum alloy material 15 and the molten aluminum 17 and allows the molten aluminum 17 to flow therein. The flow path may be a space defined by a cavity or groove formed in the jig 10 and the first wrought aluminum alloy material 15. The internal space defined by the first jig 11 and the second jig 13 has any shape which is appropriately set to correspond to a shape of the first wrought aluminum alloy material 15 to be used, a shape of a joining surface, and the like.

<Basic Procedure of Method for Joining Aluminum Material>

The method for joining an aluminum material as described below is a method which allows a wrought aluminum alloy material and molten aluminum to be joined with each other in a simple manner and also with a high strength, and the following steps (1) and (2) are basically performed in this order.

(1) A step of pouring the molten aluminum 17 toward the first wrought aluminum alloy material 15 through the pouring port 21 under pressure to cause the molten aluminum 17 to collide with a surface (inner surface) of the first wrought aluminum alloy material 15, thereby digging down the first wrought aluminum alloy material 15 at a collision position between the molten aluminum 17 and the first wrought aluminum alloy material 15.

(2) A step of flowing the molten aluminum 17 together with a fraction of the first wrought aluminum alloy material 15 removed by digging within the internal space along the surface (inner surface 15b) of the first wrought aluminum alloy material 15 around the collision position.

In the steps as described above, as shown by an arrow F1 in FIG. 1, the molten aluminum is poured toward the first wrought aluminum alloy material 15 arranged in the internal space of the jig 10 under pressure, thereby causing the molten aluminum 17 to strongly collide with the inner surface 15h of the first wrought aluminum alloy material 15. At this time, at the collision position on the first Wrought aluminum alloy material 15, an external force due to the collision of the molten aluminum 17 is exerted on the first wrought aluminum alloy material 15, thereby digging down the first wrought aluminum alloy material 15 at the collision position. That is, a material surface layer at the collision position is gradually removed by the molten aluminum 17 and a reduced thickness portion is formed at the collision position. As the collision of the molten aluminum 17 continues, the reduced thickness portion further grows (thins) in a thickness direction of the first wrought aluminum alloy material 15 by the collision energy. The collision direction of the molten aluminum 17 is preferably a direction perpendicular to the inner surface 15b of the first wrought aluminum alloy material 15 but may be appropriately changed depending on the shape of the internal space or the like. The collision direction can be adjusted by changing an axial direction of the pouring port 21, by using the pouring port 21 with a gate having any suitable shape, or the like.

After collision, the molten aluminum 17 extends along the inner surface 15b from the collision position on the first wrought aluminum alloy material 15 and then covers the inner surface 15b serving as a joining surface. This gives a high-strength joining state in which the inner surface 15b of the first wrought aluminum alloy material 15 and the aluminum cast obtained by solidifying the molten aluminum 17 are solid-phase diffusion bonded with each other. A period of time from the start of supply of the molten aluminum 17 to the completion of filling of the internal space varies depending on a volume of the internal space, but is 1 second or less, preferably 0.8 second or less, and more preferably 0.5 second or less. A joined body in which the first wrought aluminum alloy material 15 and the aluminum cast 33 are joined with each other with high strength is obtained in such a short time.

Also, as shown by an arrow F2 in FIG. 1, the jig 10 is preferably provided with an overflow (not shown) for storing the molten aluminum 17 overflows from the gap 19. As for the overflow, a structure to be used in a general injection molding technique can be employed.

In a case where the overflow is connected to the internal space of the jig 10, when the molten aluminum 17 is supplied to the pouring port 21, the molten aluminum 17 is first poured into the gap 19 through the pouring port 21, and the gap 19 is filled with the molten aluminum 17, Then, once the molten aluminum 17 overflows from the gap 19 to the overflow and is stored in the overflow, supplying of the molten aluminum 17 is stopped. Therefore, the molten aluminum 17 is allowed to flow within the gap 19 without stagnating therein.

It is preferred that the jig 10 includes a heater that heats or warms at least one of the first jig 11 and the second jig 13. In this case, a temperature controller (not shown) that controls the heater is configured to heat the heater before the molten aluminum 17 is poured into the gap 19 and keep the first wrought aluminum alloy material 15 and the second jig 13 at 400° C. to 500° C. Therefore, even if the gap 19 serving as a flow path for the molten aluminum 17 is, for example, as thin as 3 mm or less, the molten aluminum 17 flowing within the gap 19 can smoothly flow without solidifying and pooling during flowing.

Once the gap 19 is filled with the molten aluminum 17 flowing within the gap 19 and the molten aluminum 17 is cooled and solidified, the first jig 11 and the second jig 13 are separated from each other. Then, the joined body in which the first wrought aluminum alloy material 15 and the aluminum cast are joined with each other is taken out from the jig 10. In the joined body, the joining surface of the first wrought aluminum alloy material 15 is solid-phase diffusion bonded with the aluminum cast. Unnecessary portions (the overflow and the like), such as a portion molded by the pouring port 21, are cut from the aluminum cast.

Next, the step of pouring the molten aluminum 17 into the gap 19 and joining the first wrought aluminum alloy material 15 and the aluminum cast 33 to each other as described above are described by way of example with reference to first to sixth joining embodiments which are different from each other. The joining embodiment is not limited to these embodiments, and the embodiments may be combined with each other.

First Joining Embodiment

Figure 2A:
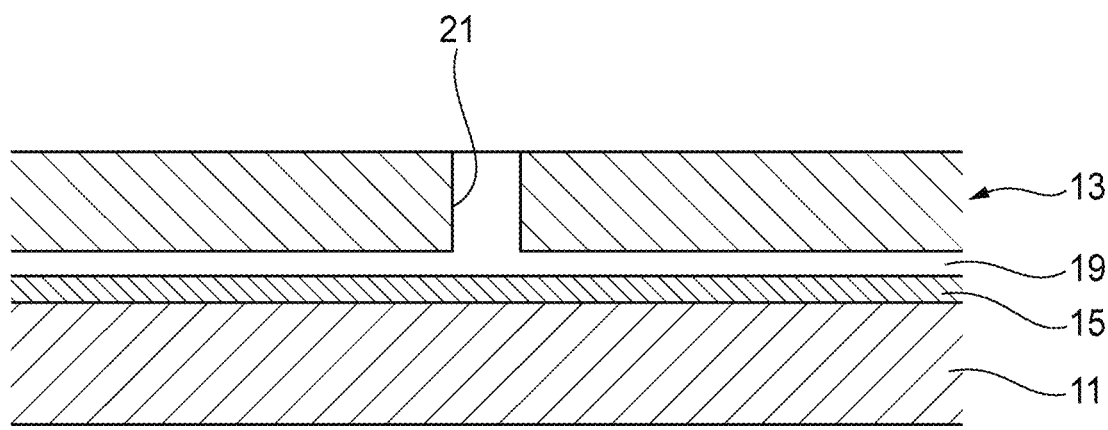
FIG. 2A is a process explanatory diagram showing an aspect in which a first wrought aluminum alloy material is arranged in an internal space of the jig.
Figure 2B:
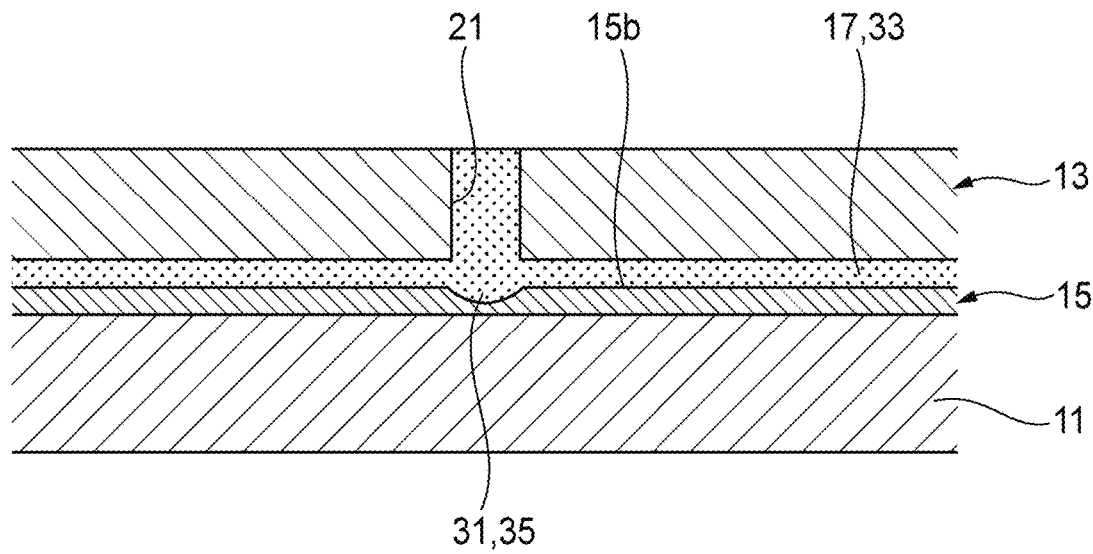
FIG. 2B is a process explanatory diagram showing an aspect in which molten aluminum has been poured into the internal space shown in FIG. 2A.

FIG. 2A is a process explanatory diagram showing an aspect in which the first wrought aluminum alloy material is arranged in the internal space of the jig. FIG. 2B is a process explanatory diagram showing an aspect in which the molten aluminum has been poured into the internal space shown in FIG. 2A.

(Formation of Protrusion)

As shown in FIG. 2A, the first jig 11 and the second jig 13 are spaced apart from each other and the flat plate-shaped first wrought aluminum alloy material 15 is inserted between the jigs, and the first wrought aluminum alloy material 15 is arranged along the first jig 11. Then, the first jig 11 and the second jig 13 are brought close to each other to a predetermined position and fixed. In this state, the molten aluminum 17 is poured through the pouring port 21. Then, as shown in FIG. 2B, a surface layer of the first wrought aluminum alloy material 15 at the collision position between the first wrought aluminum alloy material 15 and the molten metal 17 is gradually removed and a reduced thickness portion 31 is formed at the collision position. After the collision, the molten aluminum flows along the inner surface 15b of the first wrought aluminum alloy material 15, which is exposed to the internal space.

Then, after the jig is cooled and the molten aluminum 17 is solidified, the inner surface 15b serving as the joining surface of the first wrought aluminum alloy material 15 is covered with the aluminum cast 33. The aluminum cast 33 has a protrusion 35 integrally formed therewith by solidification of the molten aluminum 17 at the reduced thickness portion 31. The protrusion 35 is formed in a region of the first wrought aluminum alloy material 15, which is recessed in the thickness direction, and protrudes along the axial direction of the pouring port 21. The protrusion 35 in this configuration is formed to a degree within the thickness of the first wrought aluminum alloy material 15.

The protrusion 35 increases a joining area between the first wrought aluminum alloy material 15 and the aluminum cast 33 and protrudes out of a plane therebetween to exhibit an anti-slip effect on the joining surface. For example, when an external force in a direction parallel to the joining surface or a torsion force within the joining surface exerts on the joined body of the first wrought aluminum alloy material 15 and the aluminum cast 33, the protrusion 35 serves as an engaging portion between the first wrought aluminum alloy material 15 and the aluminum cast 33, thereby making it difficult to cause peeling at the joining surface. By forming the protrusion 35, a joining strength can be greatly enhanced, as compared with a case where the first wrought aluminum alloy material 15 and the aluminum cast 33 are connected to each other by face connection between flat surfaces thereof.

(Solid-Phase Diffusion Bonding)

Also, the joining surface of the first wrought aluminum alloy material 15 and the aluminum cast 33 are solid-phase diffusion bonded with each other, thereby obtaining a high joining strength. The reason why the first wrought aluminum alloy material 15 and the aluminum cast 33 are solid-phase diffusion bonded with each other as described above is assumed as follows.

FIG. 3A to FIG. 3E are a process explanatory diagram showing a step-by-step aspect until the internal space is filled with the molten aluminum and the molten aluminum is solidified.

Figure 3A:
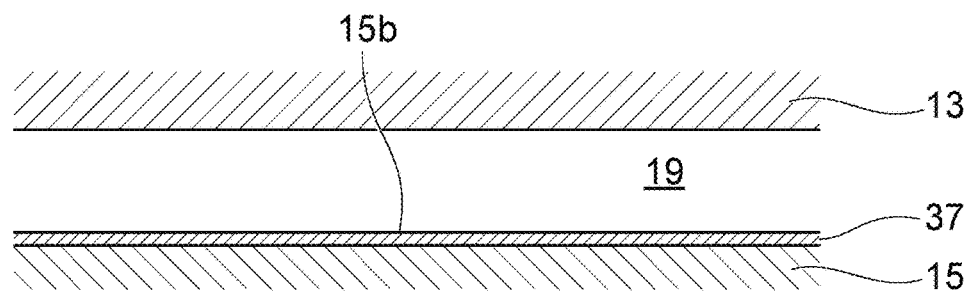
FIG. 3A is a process explanatory diagram showing a step-by-step aspect until the internal space is filled with the molten aluminum and the molten aluminum is solidified.

As shown in FIG. 3A, the first wrought aluminum alloy material 15 is arranged in the gap 19 serving as the flow path for the molten aluminum while exposing the inner surface 15b (joining surface). In general, a surface layer 37 containing organic substances such as an oxide film or oil, and foreign substances, such as dust, is formed on the inner surface 15b of the first wrought aluminum alloy material 15, which is a metal material. Accordingly, there is no case where a base metal material is exposed as it is.

Subsequently, molten aluminum is sprayed toward the gap 19 at a high pressure through the pouring port 21 shown in FIG. 2A. Then, two flows are sequentially generated in the pouring port 21 and the gap 19. That is, a leading flow, which includes droplets of the molten aluminum 17, and a trailing flow following the leading flow, the trailing flow being composed of the molten aluminum flowing within the gap 19, are generated.

Figure 3B:
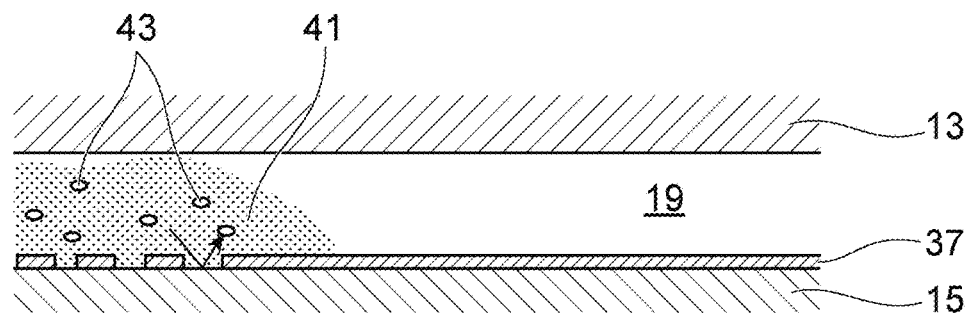
FIG. 3B is a process explanatory diagram showing a step-by-step aspect until the internal space is filled with the molten aluminum and the molten aluminum is solidified.

That is, as shown in FIG. 3B, when a leading flow including melt droplets 41 moves along the first wrought aluminum alloy material 15 in the gap 19, the melt droplets 41 included in the leading flow are partially solidified to form fine particles 43 due to contact with inner walls of the gap 19 or dissipation of heat by an ambient environment in the gap 19 during moving.

Figure 3C:
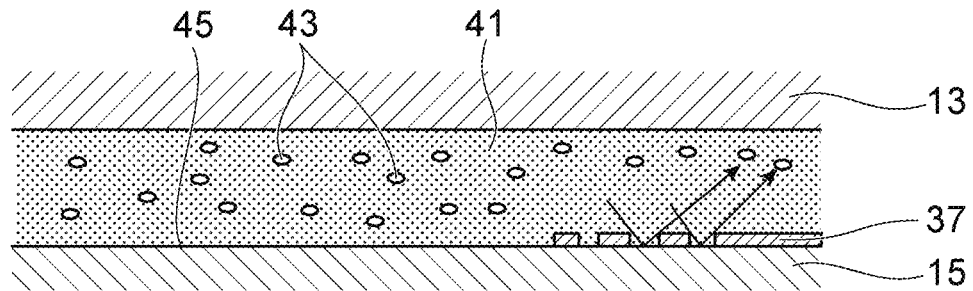
FIG. 3C is a process explanatory diagram showing a step-by-step aspect until the internal space is filled with the molten aluminum and the molten aluminum is solidified.

The generated fine particles 43 repeatedly collide with the first wrought aluminum alloy material 15 in the leading flow and scrape off the surface layer 37 of the first wrought aluminum alloy material 15 as shown in FIG. 3C. Then, a fresh surface 45, which is obtained by removal of the surface layer 37, is exposed on the first wrought aluminum alloy material 15.

Figure 3D:
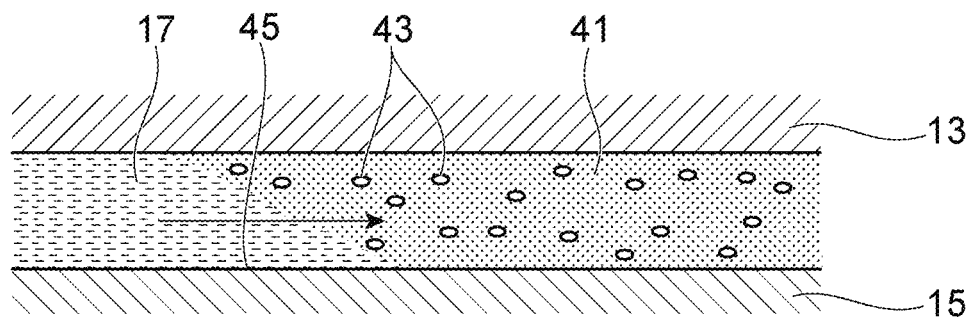
FIG. 3D is a process explanatory diagram showing a step-by-step aspect until the internal space is filled with the molten aluminum and the molten aluminum is solidified.
Figure 3E:
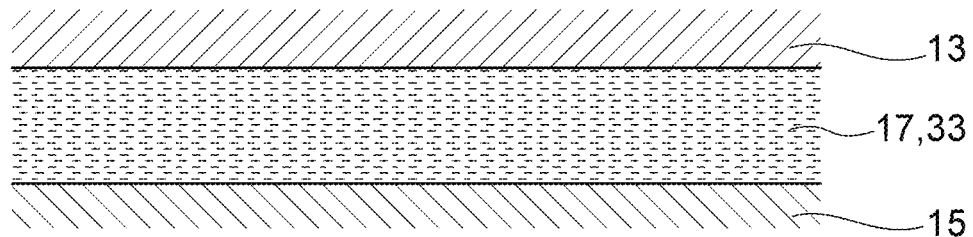
FIG. 3E is a process explanatory diagram showing a step-by-step aspect until the internal space is filled with the molten aluminum and the molten aluminum is solidified.

Then, when the trailing flow, which follows the leading flow and is the molten aluminum 17, reaches a position of the first wrought aluminum alloy material 15 as shown in FIG. 3D, the fresh surface 45 is covered with the molten aluminum 17 as shown in FIG. 3E. A period of time until the fresh surface 45 is covered with the molten aluminum 17 after the fresh surface 45 is exposed on the first wrought aluminum alloy material 15 is extremely short. Accordingly, an oxide film having such a thickness as to affect the joining strength with the aluminum cast 33 is not formed on the fresh surface 45.

Then, the fresh surface 45 of the first wrought aluminum alloy material 15 is covered with the molten aluminum 17 at a solid-phase bonding temperature being lower than the melting point of aluminum, and the molten aluminum 17 in the gap 19 is kept at a predetermined pressure during a predetermined time. Due to this process, solid-phase diffusion occurs between the fresh surface 45 of the first wrought aluminum alloy material 15 and the aluminum cast 33 obtained by solidifying the molten aluminum 17, thereby causing both to be solid-phase diffusion bonded with each other. In this way, the joining surface (fresh surface 45) of the first wrought aluminum alloy material 15 is joined with the aluminum cast 33 in a high-strength solid-phase diffusion bonded state.

As described above, the first wrought aluminum alloy material 15 is arranged in the internal space of the jig 10 with the joining surface exposed thereto, and then the molten aluminum 17 is poured into the gap 19 under high pressure, thereby forming a fresh surface on the joining surface of the first wrought aluminum alloy material 15. The formed fresh surface is immediately covered with the molten aluminum 17. Therefore, the first wrought aluminum alloy material 15 and the aluminum cast 33 are easily solid-phase diffusion bonded with each other and thus joined with high strength.

Although the melt droplets of aluminum as used herein means droplets of molten aluminum generated when spraying the molten aluminum under pressure, the melt droplets are not limited thereto. The melt droplets of aluminum may be melt droplets generated by any other common methods. Although steps of generating the melt droplets, forming the fresh surface, and covering the fresh surface with the melt droplets can be performed in the atmosphere, the steps may be performed under vacuum or in an inert gas environment. In this case, it is possible to more reliably prevent an oxide film from being formed on the fresh surface.

Further, in the case where the first wrought aluminum alloy material 15, the first jig 11 and the second jig 13 are heated and warmed by the heater (not shown) when the molten aluminum 17 is poured into the gap 19, even if a reduced thickness portion having a thickness of 3 mm or less is formed, it is possible to allow the molten aluminum 17 to smoothly flow in a region, which is to become the reduced thickness portion. Therefore, it is possible to obtain the aluminum cast 33 with a high-quality, in which there is almost no underfill or blowholes.

In addition, by allowing a part of the molten aluminum 17 overflowing from the gap 19 to be discharged to the overflow (not shown), it is possible to allow the molten aluminum 17 to smoothly flow in the gap 19. Therefore, stagnancy of the molten aluminum 17 in the flow path is prevented.

Regarding the solid-phase diffusion bonding between the first wrought aluminum alloy material 15 and the aluminum cast 33, similar effects are also obtained in the other joining embodiments as described below. Therefore, in the following joining embodiments, the description regarding the solid-phase diffusion bonding is omitted.

Second Joining Embodiment

Figure 4A:
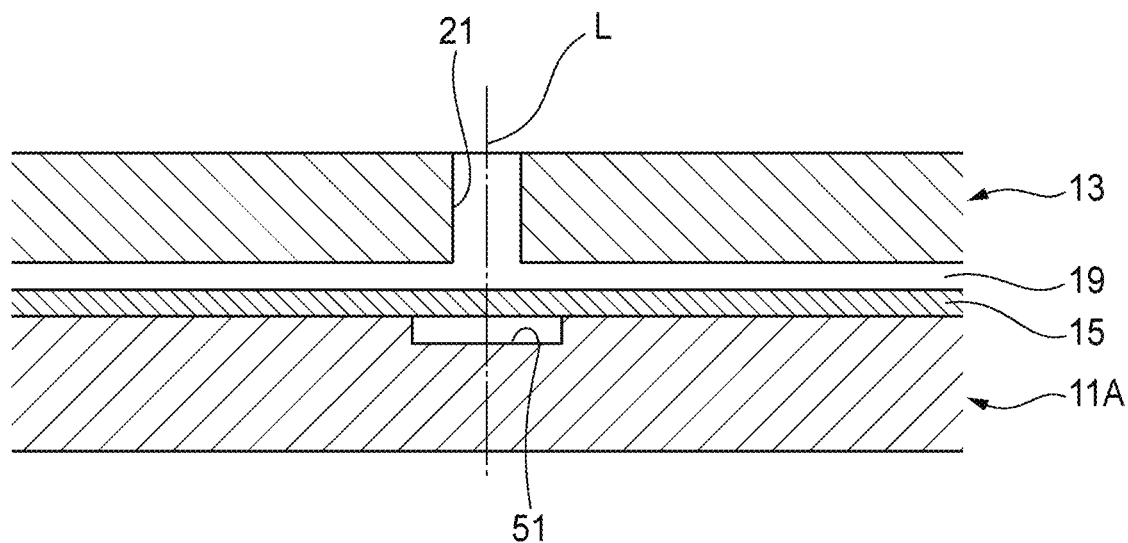
FIG. 4A is a process explanatory diagram showing an aspect in which a wrought aluminum alloy material is arranged in the internal space of the jig.
Figure 4B:
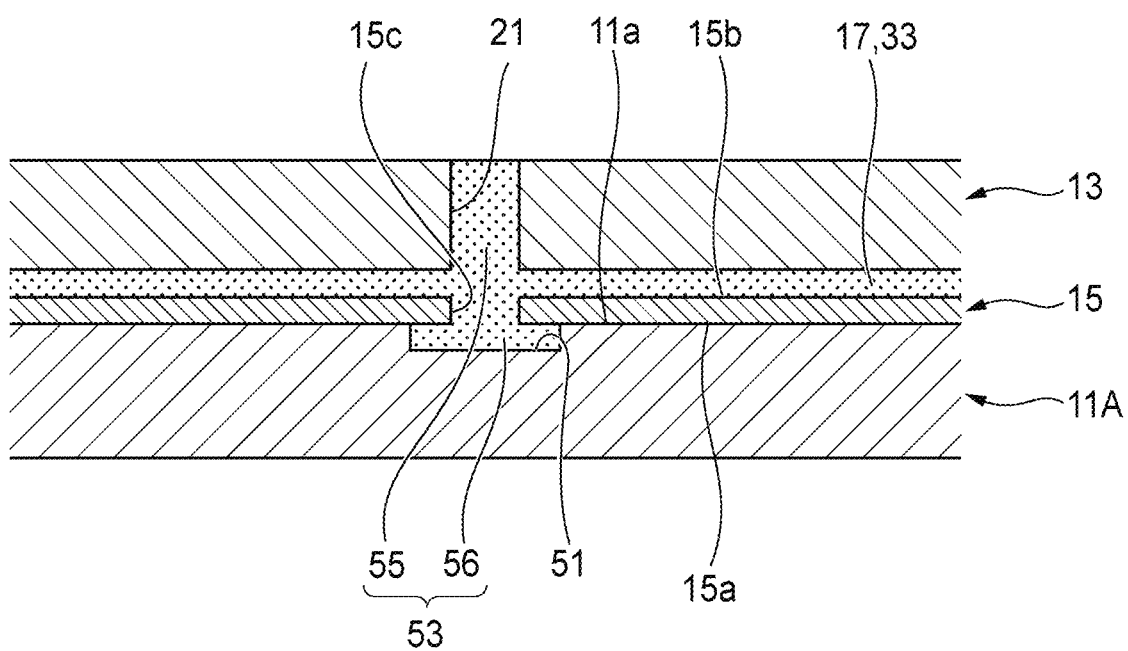
FIG. 4B is a process explanatory diagram showing an aspect in which molten aluminum has been poured into the internal space shown in FIG. 4A.

FIG. 4A is a process explanatory diagram showing an aspect in which the wrought aluminum alloy material is arranged in the internal space of the jig. FIG. 4B is a process explanatory diagram showing an aspect in which the molten aluminum has been poured into the internal space shown in FIG. 4A. In the following description, the same members or portions as members or portions described above are designated by the same reference numerals, and accordingly the descriptions thereof are simplified or omitted.

As shown in FIG. 4A, in a first jig 11A in this joining embodiment, a recessed portion 51 is provided at a position that faces the pouring port 21 and is in a contact surface 11a with the first wrought aluminum alloy material 15. It is preferred that the recessed portion 51 has an opening area larger than an opening area of the pouring port 21 about an axis L of the pouring port 21. In a case where the opening of the pouring port 21 is circular, an inner diameter of the recessed portion 51 is preferably larger than an inner diameter of the pouring port 21.

As shown in FIG. 4B, when molten aluminum 17 is poured toward the first wrought aluminum alloy material 15 through the pouring port 21, a reduced thickness portion 31 (see FIG. 2B) is formed at a collision position between the molten aluminum 17 and the first wrought aluminum alloy material 15, like the case of the first joining embodiment described above. The reduced thickness portion grows along the axis L and the first wrought aluminum alloy material 15 is penetrated in a thickness direction thereof, thereby forming a runner 15c. When the reduced thickness portion thins and the molten aluminum 17 passes through the first wrought aluminum alloy material 15, the pouring port 21 communicate with the recessed portion 51, so that the recessed portion 51 is filled with the molten aluminum 17 flowing through the runner 15c.

Once the gap 19 and the recessed portion 51 are filled with the molten aluminum 17 and then the molten aluminum 17 is solidified, a clamping portion 53 that clamps the outer surface 15a and inner surface 15b of the first wrought aluminum alloy material 15 in the thickness direction is formed in a region between the pouring port 21 and the runner 15c of the first wrought aluminum alloy material 15 and also in the recessed portion 51. The clamping portion 53 includes a shaft portion 55 formed between the pouring port 21 and the runner 15c and a head portion 56 formed by the recessed portion 51 and connected to the shaft portion 55. The clamping portion 53 is configured to clamp the first wrought aluminum alloy material 15 between the head portion 56, which protrudes outward from the runner 15c, and the aluminum cast 33, which is formed in the gap 19 (see FIG. 4A). That is, the first wrought aluminum alloy material 15 and the aluminum cast 33 are joined as if they are riveted. Therefore, the joining strength between the first wrought aluminum alloy material 15 and the aluminum cast 33 is enhanced.

Third Joining Embodiment

Figure 5A:
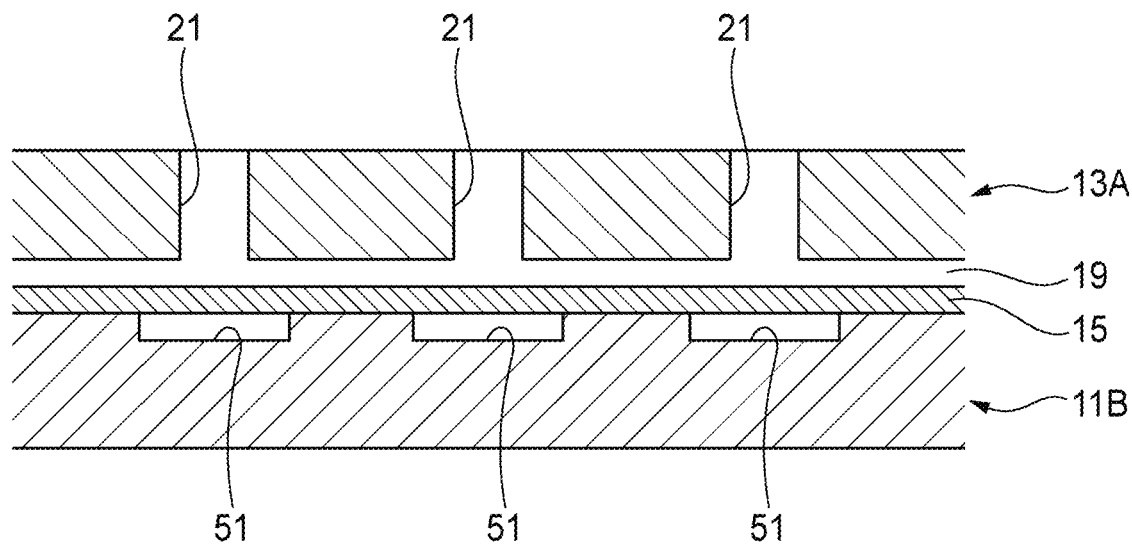
FIG. 5A is a process explanatory diagram showing an aspect in which a plurality of through-holes and recessed portions are provided in the internal space of the jig.
Figure 5B:
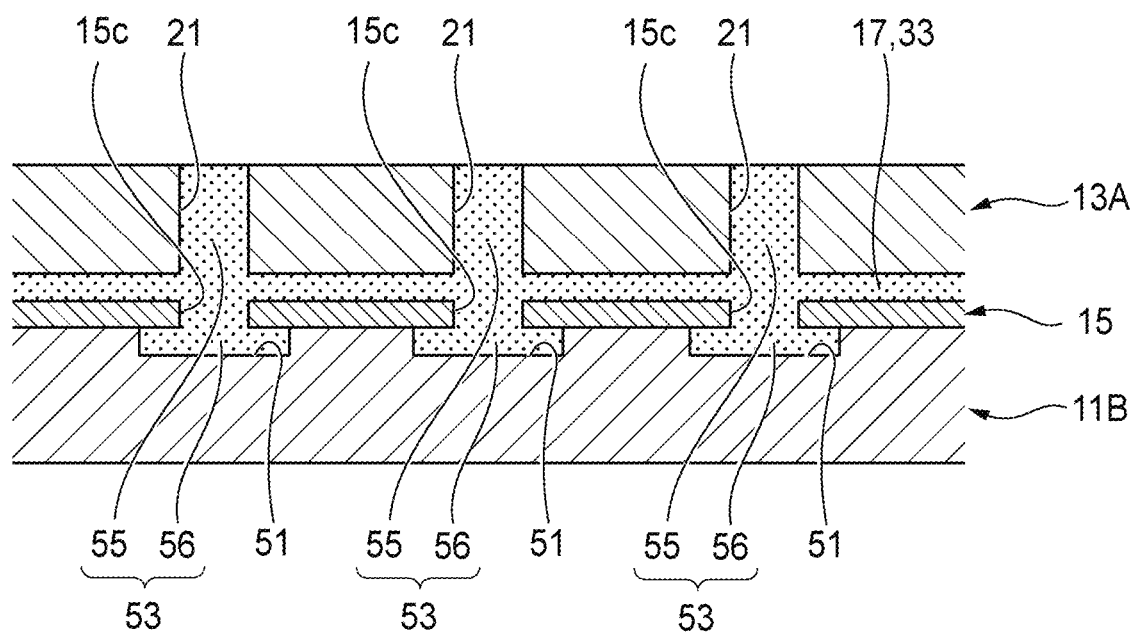
FIG. 5B is a process explanatory diagram showing an aspect in which molten aluminum has been poured into the internal space shown in FIG. 5A.

FIG. 5A is a process explanatory diagram showing an aspect in which a plurality of through-holes and recessed portions are provided in the internal space of the jig. FIG. 5B is a process explanatory diagram showing an aspect in which molten aluminum has been poured into the internal space shown in FIG. 5A.

A first jig 11B and a second jig 13A in this joining embodiment are configured such that the above-described clamping portion 53 shown in FIG. 4B is formed in a plurality of positions. As shown in FIG. 5A, a plurality of (e.g., three) pouring ports 21 is provided in the second jig 13A. In the first jig 11B, the above-described recessed portions 51 are provided at positions facing the pouring ports 21, respectively.

As shown in FIG. 5B, when molten aluminum 17 is poured toward the first wrought aluminum alloy material 15 through the plurality of porting ports 21, a plurality of clamping portions 53 are respectively formed at different positions of the first wrought aluminum alloy material 15. According to this configuration, the joining strength between the first wrought aluminum alloy material 15 and the aluminum cast 33 can be further enhanced. Further, it is possible to arrange the clamping portions 53 at equal intervals so as to obtain an equal joining strength, or to widen or narrow the interval depending on positions so as to obtain a desired distribution in joining strength. For example, in a case where a position where a higher joining strength is required as compared with the surroundings is clear in advance, an arrangement density of the clamping portions 53 at the position is increased as compared with the surroundings, thereby efficiently improving the mechanical strength of the joined body.

Fourth Joining Embodiment

Figure 6A:
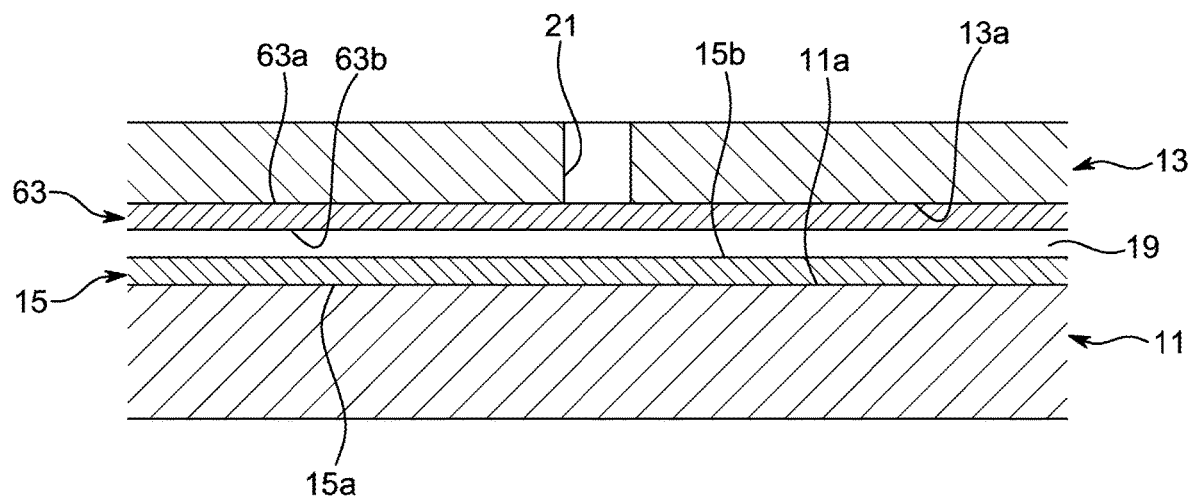
FIG. 6A is a process explanatory diagram showing an aspect in which a pair of wrought aluminum alloy materials are arranged in the internal space of the jig.
Figure 6B:
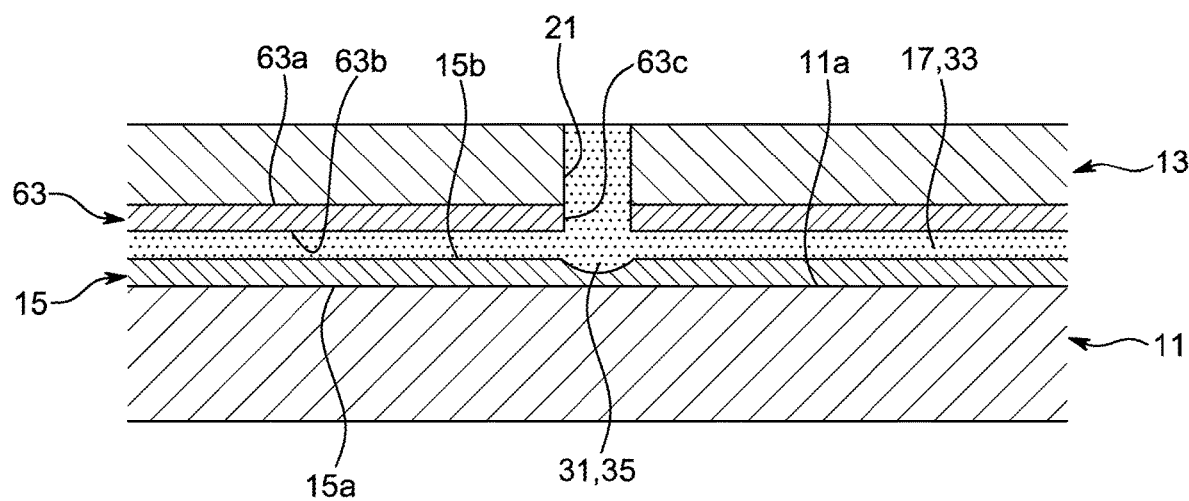
FIG. 6B is a process explanatory diagram showing an aspect in which molten aluminum has been poured into the internal space shown in FIG. 6A.

FIG. 6A is a process explanatory diagram showing an aspect in which a pair of wrought aluminum alloy materials are arranged in the internal space of the jig. FIG. 6B is a process explanatory diagram showing an aspect in which molten aluminum has been poured into the internal space shown in FIG. 6A.

In this joining embodiment, as shown in FIG. 6A, a second wrought aluminum alloy material 63 has an outer surface 63a and inner surface 63b, and is arranged to face the first wrought aluminum alloy material 15 arranged on a side of the first jig 11 in the internal space between the first jig 11 and the second jig 13. The second wrought aluminum alloy material 63 is arranged along a contact surface 13a of the second jig 13 to define a gap 19 between the second wrought aluminum alloy material 63 and the inner surface 15b of the first wrought aluminum alloy material 15. The second wrought aluminum alloy material 63 is fixed to the second jig 13 by a suitable fixing means (not shown). The other configuration is similar to the configuration shown in FIG. 2A described above.

In this configuration, an outlet side of the pouring port 21 formed in the second jig 13 is blocked by the second wrought aluminum alloy material 63.

In the above configuration, when molten aluminum 17 is poured under pressure through the pouring port 21, the molten aluminum 17 collides with the second wrought aluminum alloy material 63 facing the pouring port 21 to cause the second wrought aluminum alloy material 63 to be punctured at the collision position by pressure. Therefore, a through-hole 63c having a shape corresponding to the pouring port 21 is formed in the second wrought aluminum alloy material 63 as shown in FIG. 6B.

Once the through-hole 63c is formed in the second wrought aluminum alloy material 63, the molten aluminum 17 is poured into the gap 19 from the pouring port 21 through the through-hole 63c.

At this time, the poured molten aluminum 17 collides with the first wrought aluminum alloy material 15 after passing through the pouring port 21 and the through-hole 63c. Then, like the case as shown in FIG. 2B, a reduced thickness portion 31 is formed at the collision position. The reduced thickness portion 31 grows in a thickness direction of the first wrought aluminum alloy material 15, so that after solidification of the molten aluminum 17, a protrusion 35 is formed by the aluminum cast 33.

According to this joining embodiment, the first wrought aluminum alloy material 15 and the second wrought aluminum alloy material 63 overlapping each other in the thickness direction are integrated by joining the inner surfaces 15b and 63b with each other via the aluminum cast 33. At a position corresponding to the pouring port 21, the protrusion 35 protruding in the thickness direction of the first wrought aluminum alloy material 15 is formed in the aluminum cast 33. Further, the through-hole 63c is formed in the second wrought aluminum alloy material 63, and an inner peripheral surface of the through-hole 63c is joined with the aluminum cast 33. Since the protrusion 35 and the through-hole 63c are formed in this way, the joining strength of the aluminum cast 33 with the first wrought aluminum alloy material 15 and the second wrought aluminum alloy material 63 can be enhanced. In addition, since the through-hole 63c is formed in the second wrought aluminum alloy material 63 when the molten aluminum 17 is poured, manhours can be reduced and workability can be enhanced as compared with, for example, a case where a prepared hole is formed in advance.

Fifth Joining Embodiment

Figure 7A:
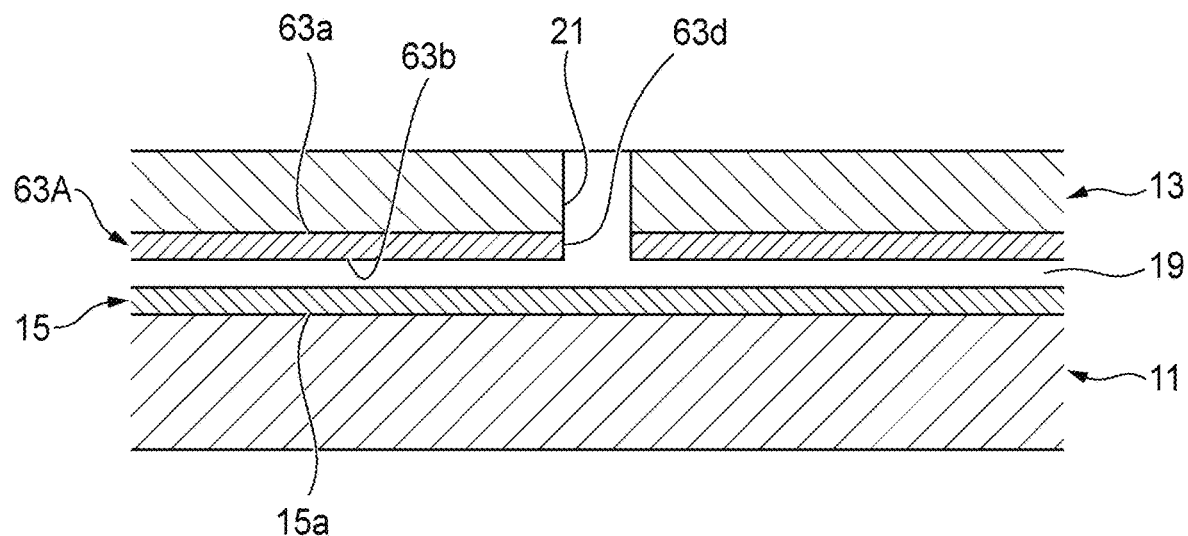
FIG. 7A is a process explanatory diagram showing an aspect in which a wrought aluminum alloy material having a prepared hole is arranged in the internal space of the jig.
Figure 7B:
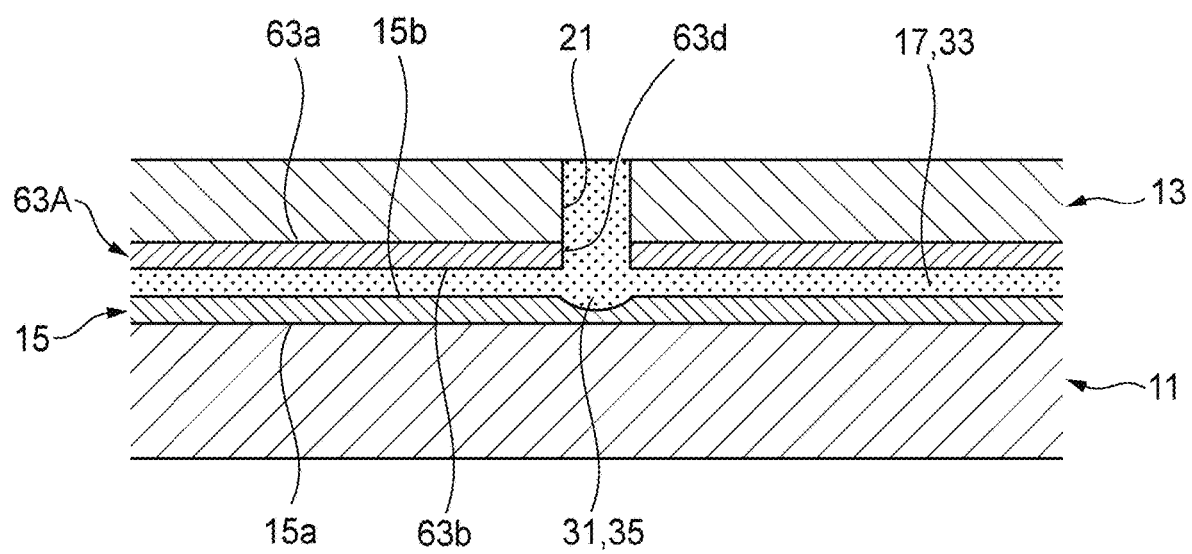
FIG. 7B is a process explanatory diagram showing an aspect in which molten aluminum has been poured into the internal space shown in FIG. 7A.

FIG. 7A is a process explanatory diagram showing an aspect in which a wrought aluminum alloy material having a prepared hole is arranged in the internal space of the jig. FIG. 7B is a process explanatory diagram showing an aspect in which molten aluminum has been poured into the internal space shown in FIG. 7A.

In this joining embodiment, as shown in FIG. 7A, a prepared hole 63d is previously provided in the second wrought aluminum alloy material 63 shown in FIG. 6A at a position facing the pouring port 21. The other configuration is similar to those of the fourth joining embodiment. The prepared hole 63d may be a through-hole machined by a drill or the like but may be a cutout formed by removing a part of the plate material. That is, as for the prepared hole 63d as described here, any shape may be used as long as the prepared hole 63d allows the pouring port 21 to be communicated with the gap 19.

In the above configuration, when molten aluminum 17 is poured through the pouring port 21, the molten aluminum 17 passes through the prepared hole 63d of the second wrought aluminum alloy material 63A, and the gap 19 is filled with the molten aluminum 17, as shown in FIG. 7B. Further, the poured molten aluminum 17 collides with the inner surface 15b of the first wrought aluminum alloy material 15 and forms a reduced thickness portion 31 in the first wrought aluminum alloy material 15. The reduced thickness portion 31 grows in the thickness direction of the first wrought aluminum alloy material 15. Further, after solidification of the molten aluminum 17, the aluminum cast 33 is formed to have a protrusion 35, like the case shown in FIG. 2B.

In this configuration, since the prepared hole 63d is provided in the second wrought aluminum alloy material 63 before pouring the molten aluminum 17, the molten aluminum 17 can be directly poured into the gap 19 through the pouring port 21. Therefore, it is possible to quickly complete filling of the gap 19 with the molten aluminum 17, thereby shortening the tact time.

In FIG. 7A and FIG. 7B, the prepared hole 63d is shown to have substantially the same size as the pouring port 21, but for example, an opening area of the prepared hole 63d may be larger than that of the pouring port 21. In this case, it is possible to alleviate a positioning accuracy of the second wrought aluminum alloy material 63 with respect to the second jig 13, thereby improving the workability. Further, in a case where the prepared hole 63d is configured to be a hole having an opening area smaller than that of the pouring port 21, a flow velocity of the molten aluminum 17 supplied into the gap 19 is increased. Therefore, it is possible to increase a collision speed against the first wrought aluminum alloy material 15, thereby facilitating formation of the reduced thickness portion 31. In addition, a flow velocity of the molten aluminum 17 flowing along the inner surface 15b of the first wrought aluminum alloy material 15 and the inner surface 63b of the second wrought aluminum alloy material 63A is also increased, thereby further facilitating formation of the above-described fresh surface.

Sixth Joining Embodiment

Next, a case where a pair of tubular wrought aluminum alloy materials are joined with each other is described.

Figure 8A:
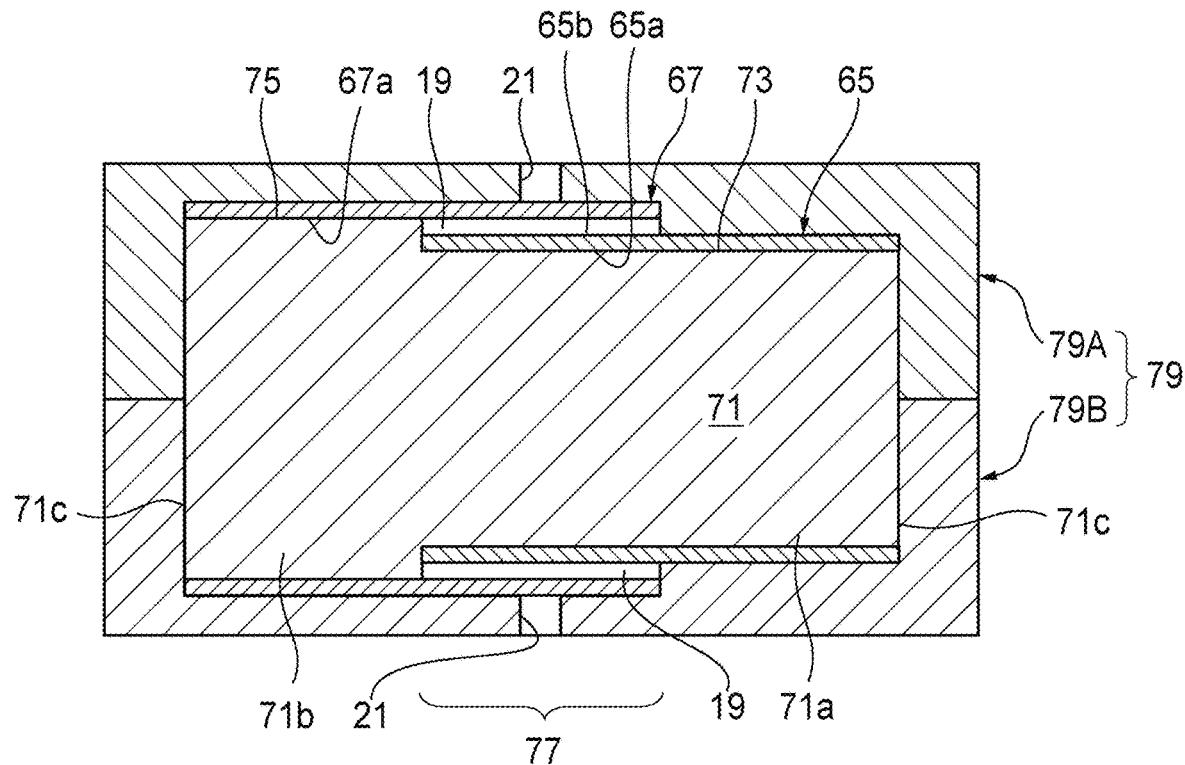
FIG. 8A is a process explanatory diagram showing an aspect in which a pair of tubular wrought aluminum alloy materials are arranged in the internal space of the jig.
Figure 8B:
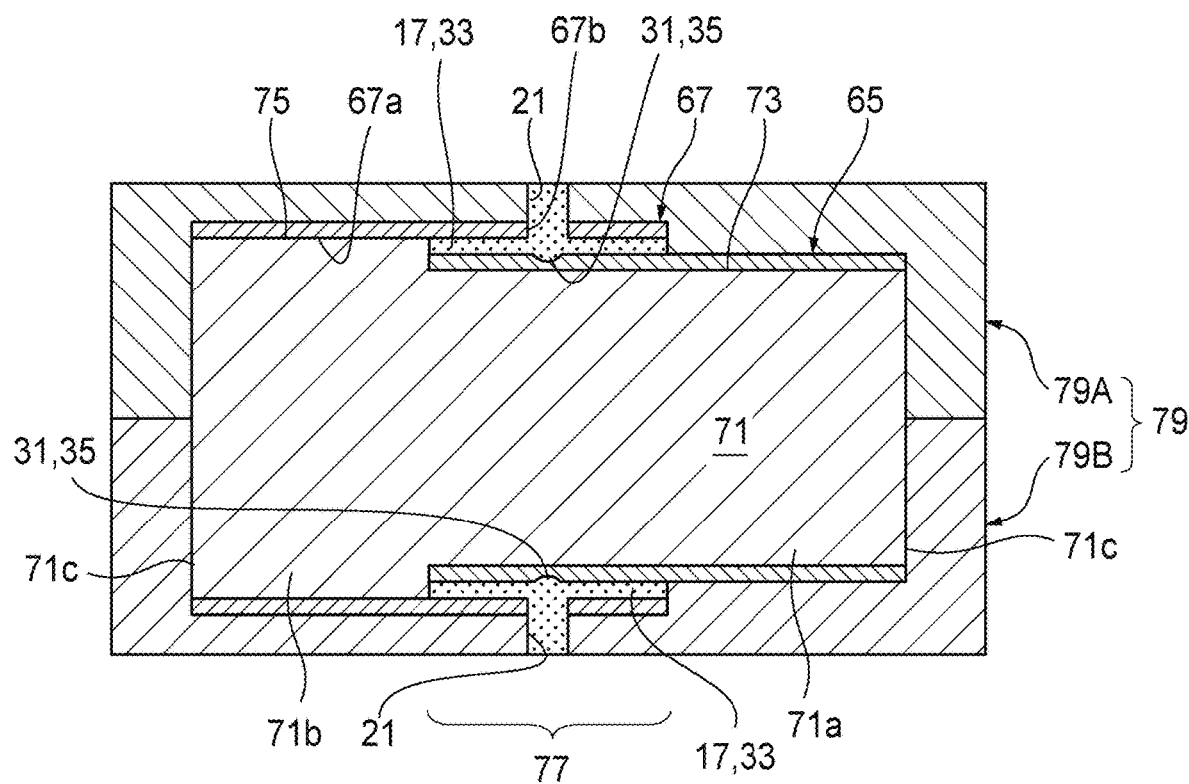
FIG. 8B is a process explanatory diagram showing an aspect in which molten aluminum has been poured into the internal space shown in FIG. 8A.

FIG. 8A is a process explanatory diagram showing an aspect in which a pair of tubular wrought aluminum alloy materials are arranged in the internal space of the jig. FIG. 8B is a process explanatory diagram showing an aspect in which molten aluminum has been poured into the internal space shown in FIG. 8A.

As shown in FIG. 8A, the pair of wrought aluminum alloy materials used here are a first wrought aluminum alloy material 65 having a tubular shape (cylindrical shape) and a second wrought aluminum alloy material 67 having a tubular shape (cylindrical shape), and the first wrought aluminum alloy material 65 is different in diameter dimension from the second wrought aluminum alloy material 67. The first wrought aluminum alloy material 65 and the second wrought aluminum alloy material 67 are supported by an approximately cylindrical core 71 serving as the above first jig. The core 71 has, along an axial direction thereof, a small-diameter portion 71a and a large-diameter portion 71b having a diameter larger than that of the small-diameter portion 71a. The first wrought aluminum alloy material 65 is supported by the small-diameter portion 71a in a state that an inner peripheral surface 65a of the first wrought aluminum alloy material 65 in contact with an outer peripheral surface 73 of the small-diameter portion 71a. The second wrought aluminum alloy material 67 is supported by the large-diameter portion 71b in a state that an inner peripheral surface 67a of the second wrought aluminum alloy material 67 is in contact with an outer peripheral surface 75 of the large-diameter portion 71b. The core 71 is configured such that the outer diameter of the small-diameter portion 71a is equal to or slightly smaller than the inner diameter of the first wrought aluminum alloy material 65 and the outer diameter of the large-diameter portion 71b is equal to or slightly smaller than the inner diameter of the second wrought aluminum alloy material 67.

The first wrought aluminum alloy material 65 and the second wrought aluminum alloy material 67, which are supported by the core 71, have an overlapping portion 77 in which tubular end portions thereof overlap each other in a radial direction along the axial direction. In the overlapping portion 77, a gap 19 in the radial direction is defined between an outer peripheral surface 65b of the first wrought aluminum alloy material 65 and the inner peripheral surface 67a of the second wrought aluminum alloy material 67.

A cylindrical split mold 79 serving as the above second jig is arranged to cover the first wrought aluminum alloy material 65 and the second wrought aluminum alloy material 67, which are supported by the core 71 as described above, and also cover end surfaces 71c of the core 71. The cylindrical split mold 79 includes one split mold 79A arranged on the upper side in FIG. 8A and the other split mold 79B arranged on the lower side.

In each of the one split mold 79A and the other split mold 79B, a pouring port 21 is provided. One pouring port 21 may be provided in each of the split molds 79A and 79B or a plurality of pouring ports 21 may be provided in each of the split molds 79A and 79B. Further, the pouring port 21 may be provided in only either of the one split mold 79A or the other split mold 79B. An inner periphery side of the pouring port 21 is blocked by the second wrought aluminum alloy material 67.

In this configuration, when molten aluminum 17 is poured through the pouring ports 21, parts of the second wrought aluminum alloy material 67 facing the pouring port 21 are opened to form through-holes 67b, as shown in FIG. 8B. Then, the molten aluminum 17 collides with the first wrought aluminum alloy material 65 after passing through the formed through-hole 67b. Therefore, reduced thickness portions 31 are formed in the first wrought aluminum alloy material 65, and the gap 19 is filled with the molten aluminum 17.

After solidification of the molten aluminum 17, protrusions 35 of the aluminum cast 33 are formed at positions corresponding to the thickness reduction portions 31 of the first wrought aluminum alloy material 65.

In this joining embodiment, even in the case of the tubular wrought aluminum alloy materials, the overlapping portions 77 therebetween can be joined with high strength by the aluminum cast 33. In addition, since the protrusions 35 and the through-holes 67b are formed, the joining strength of the aluminum cast 33 with the first wrought aluminum alloy material 65 and the second wrought aluminum alloy material 67 can be further enhanced.

Further, also in this joining embodiment, prepared holes may be previously provided in the second wrought aluminum alloy material 67 at positions facing the pouring port 21, like the case shown in FIG. 7B. In this case, the molten aluminum 17 can be directly poured into the gap 19, and accordingly, it is possible to quickly complete filling of the gap 19 with the molten aluminum 17, thereby shortening the tact time.

Seventh Joining Embodiment

Next, a specific configuration example of the jig for joining aluminum material as described above, and the solid-phase diffusion bonding method shown in FIG. 3A to FIG. 3E using this jig configuration example are described in detail below. Hereinafter, for the purpose of increasing options in material selection, the above first wrought aluminum alloy materials 15 and 65 are referred to as "metal material", and the above molten aluminum 17 is also referred to simply as "molten metal". In addition, a solidified molten metal is referred to as "filler metal". Further, as for the metal material and the molten metal (filler meal), for example, a zinc alloy, a magnesium alloy, or a copper alloy may be used depending on conditions. The metal material may be not only a material, such as a plate or an extruded material, but also a machined member, such as a pressed product or a bent product, having a face joining portion. Further, as for the aluminum cast, a member with a rib, a flange or the like in addition to the joining surface may be used.

(Basic Procedure of Solid-Phase Diffusion Bonding)

As described above, the solid-phase diffusion bonding method of a metal material is a method of solid-phase diffusion bonding a metal material with a filler metal and includes basically the following steps (1) to (5).

(1) A step of arranging a metal material in a flow path such that a to-be-joined surface thereof is exposed.
(2) A step of forming droplets of a filler metal in the flow path.
(3) A step of causing fine particles obtained by solidifying the droplets to collide with the to-be-joined surface to form a fresh surface in the to-be-joined surface.
(4) A step of covering the fresh surface with a molten metal of the filler metal after the fresh surface is formed and before an oxide film is formed thereon.
(5) A step of pressurizing the molten metal in the flow path while keeping the molten metal at a solid-phase diffusion bonding temperature, thereby solid-phase diffusion bonding the fresh surface and the filler metal.

The term "flow path" used herein means a flow path defined by a jig made of a material having a melting point higher than those of the metal material and the filler metal and corresponds to a cavity formed in the jig or to a space defined by a groove formed in the jig and the metal material. The jig may have any shape, and the shape is appropriately selected depending on the shape of the metal material and the to-be-joined surface. The molten metal of the filler metal is supplied into the flow path of the jig.

When the molten metal of the filler metal is supplied into the flow path of the jig, the molten metal is sprayed and supplied into the flow path. Then, droplets of the molten metal are formed in the flow path. The formed droplets flow through the flow path ahead of the molten metal. The droplets move forward in the flow path while heat is removed therefrom, and then the droplets are solidified in the flow path to form a large number of fine particles. The fine particles collide with the to-be-joined surface of the metal material exposed to the flow path and scrape off a surface layer of the to-be-joined surface. A fresh surface formed by scraping the surface layer is formed on the to-be-joined surface.

After the fresh surface is formed and before an oxide film is formed thereon, the molten metal of the filler metal flowing following the droplets covers the fresh surface of the metal material in the flow path. Then, the molten metal in the flow path is pressurized while keeping the molten metal at a solid-phase diffusion bonding temperature. Then, solid-phase diffusion bonding between the fresh surface and the filler metal is performed.

In the above procedure, solid-phase diffusion bonding between the metal material and the filler metal can be performed by simply spraying the molten metal of the filler metal into the flow path without melting the surface of the metal material or pretreating the surface of the metal material. Even if the to-be-joined surface of the metal material has a complicated shape, it is only necessary to form a fresh surface following the shape and then to cover the fresh surface with the molten metal, and therefore the joining process can be avoided from becoming complicated. For this reason, it is possible to increase options in selection of a joining member. Further, by pressurizing the molten metal of the filler metal in the filling space while keeping the molten metal at the solid-phase bonding temperature, solid-phase diffusion proceeds at an interface between the fresh surface of the metal material and the filler metal, thereby allowing both materials to be joined with high strength. Thereafter, by separating the jig from the metal material, a joined body in which the metal material and the filler metal are integrated by solid-phase diffusion bonding is obtained.

In the present invention, the filler metal serves as one member constituting the joined body.

In order to prevent the metal material to be molten, the filler metal is composed of a material having a melting point lower than that of the metal material, and a material for the filler metal is selected such that atoms of the material and atoms of the metal material to be joined can be diffused therebetween. In addition, a material for the filler metal may be the same kind of metal as the metal material.

Melt droplets of the molten metal of the filler metal are melt droplets obtained by spraying and scattering the molten metal under pressure. Although steps of generating the melt droplets, forming the fresh surface, and covering the fresh surface with the melt droplets can be performed in the atmosphere, the steps may be performed under vacuum or in an inert gas environment.

As described above, the fresh surface is formed on the metal material by causing the solidified particles to collide with the metal material, and then the formed fresh surface is covered with the molten metal as it is, thereby preventing an oxide film from being newly formed on the fresh surface. Therefore, the molten metal comes into contact with the fresh surface in a state where there is no (or substantially no) oxide film thereon, so that movement of atoms between the metal material and the filler metal at a bonding interface is hardly restricted. In addition, joining can be achieved over the entire fresh surface without a clearance, and thus a joining area can be enlarged and a joining strength can be enhanced.

Next, a specific procedure for forming a joined body by solid-phase diffusion bonding between the metal material and the filler metal as described above is described. A jig for forming a joined body as described below is an example, and the present invention is not limited thereto.

Figure 9:
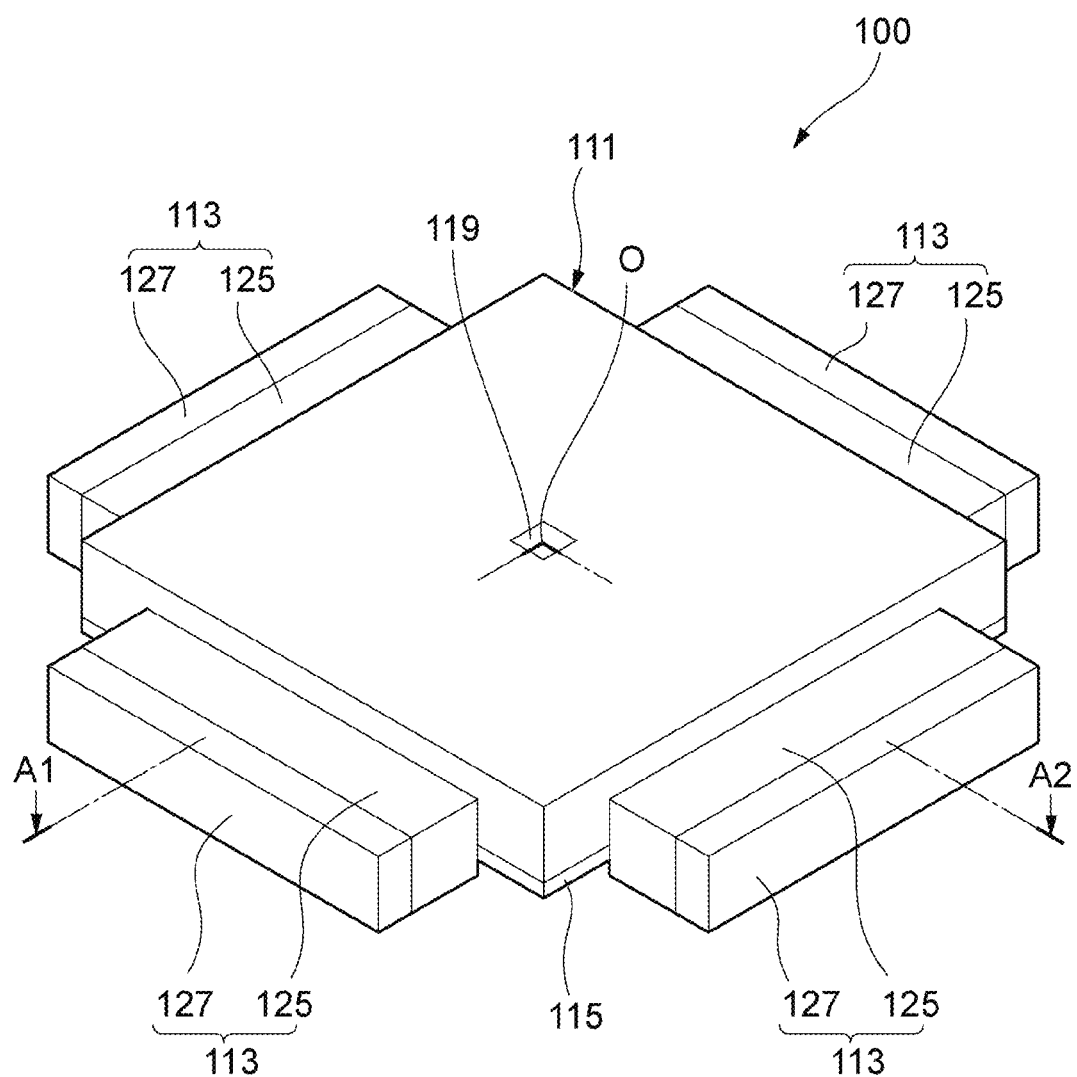
FIG. 9 is a schematic perspective view of a main part of a jig for forming a joined body in the seventh joining embodiment.
Figure 10:
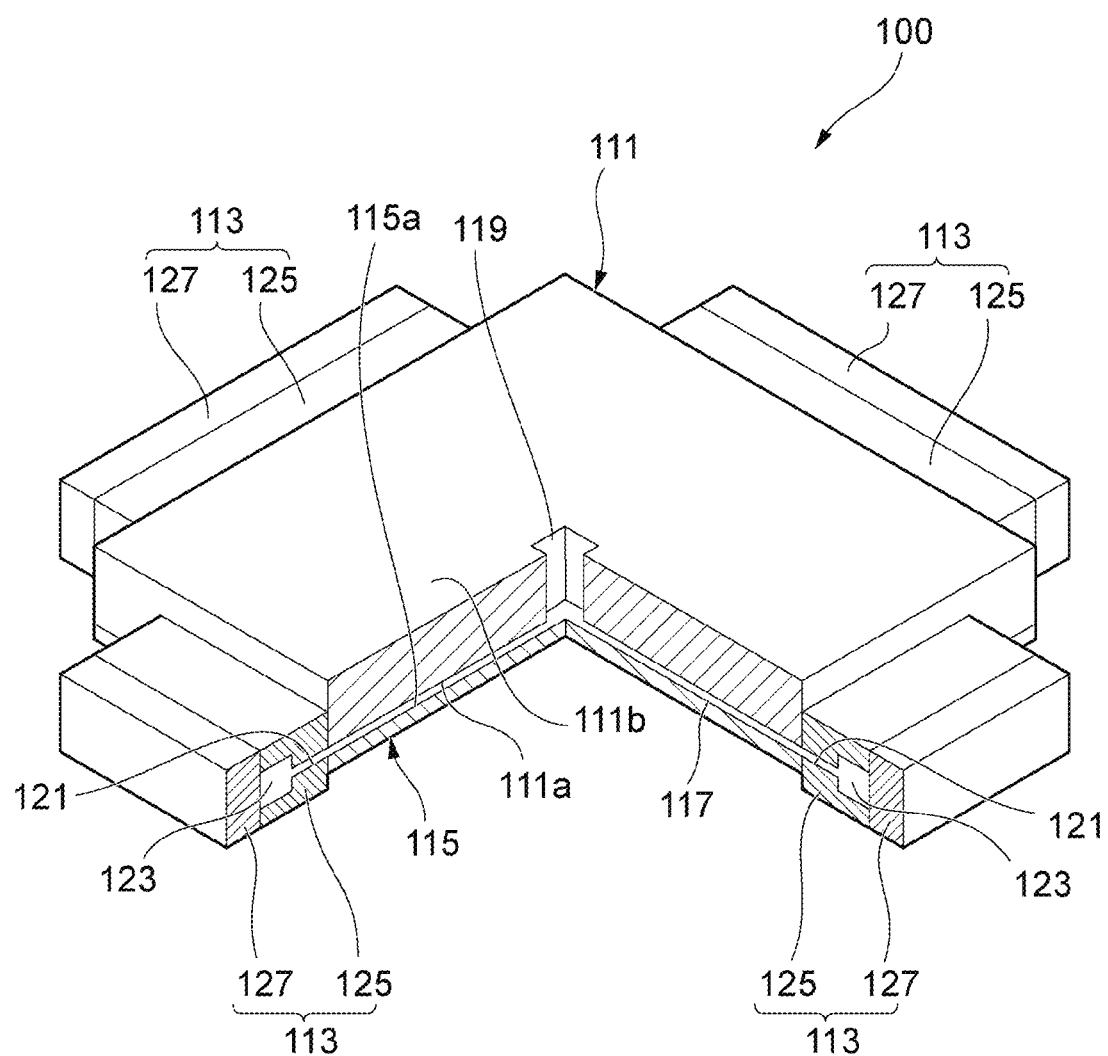
FIG. 10 is a partial sectional perspective view of the jig taken along a line A1-O-A2 in FIG. 9.

FIG. 9 is a schematic perspective view of a main part of a jig for forming a joined body in the seventh joining embodiment. FIG. 10 is a partial sectional perspective view of the jig taken along a line A1-O-A2 in FIG. 9.

As shown in FIG. 9, the jig 100 includes a flow path forming block 111 and flow path end blocks 113 connected to a part of the flow path forming block 111.

The flow path forming block 111 is arranged to vertically face a metal material 115, which becomes a component of the joined body. The metal material 115 described here has a rectangular flat plate shape. The flow path forming block 111 is supported on an upper surface 115a of the metal material 115 by a moving mechanism (not shown) in such a manner that the flow path forming block 111 can be relatively moved toward or away from the upper surface 115a.

As shown in FIG. 10, the flow path forming block 111 is arranged such that a lower surface 111a thereof facing the metal material 115 is spaced apart from the upper surface 115a of the metal material 115. Therefore, a filling space 117 is defined between the upper surface 115a of the metal material 115 and the lower surface 111a of the flow path forming block 111. In the central part of a plate face of the flow path forming block 111, an inlet 119 is formed to penetrate from an upper surface 111b to the lower surface 111a of the flow path forming block 111 and thus to communicate with the filling space 117. The inlet 119 is a flow path for supplying a molten metal of a filler metal to the filling space 117. The number of the inlet 119 is not limited to one, and the inlet 119 may be provided at a plurality of positions.

The flow path end blocks 113 in this configuration are provided on each of four sides serving as an outer edge of the rectangular flow path forming block 111. Each of the flow path end block 113 has a connection flow path 121 having one end connected to the filling space 117 of the flow path forming block 111, and a retention portion 123 connected to the other end of the connection flow path 121. The connection flow path 121 and the retention portion 123 are configured to receive a molten metal overflowed from the filling space 117. Herein, an example in which a grooved member 125 having concave grooves serving as the connection flow path 121 and the retention portion 123 is brought in close contact with a retaining member 127 for closing the concave groove of the grooved member 125 serving as the retention portion 123, thereby forming the connection flow path 121 and the retention portion 123, is described, but the present invention is not limited to such a configuration.

Although the jig 100 described above is configured such that the metal material 115 and the flow path forming block 111 are vertically overlapped, the present invention is not limited thereto. A horizontally overlapped configuration may be employed and also the layout thereof can be properly selected depending on arrangement of units, such as a jig support mechanism, a filler metal supply unit and a temperature control unit.

Next, a procedure of filling the filling space 117 formed in the jig 100 having the above configuration with the filler metal to form a joined body is schematically described.

FIG. 11 is an explanatory diagram showing an aspect in which the filler metal 131 has been supplied to the filling space 117, and illustrating a section taken along a line A1-O-A2 in the jig 100 shown in FIG. 9.

As shown in FIG. 11, the flow path end blocks 113 are brought in close contact with the outer edge of the flow path forming block 111, so that the inlet 119, the filling space 117, the connection flow path 121 and the retention portion 123 are communicated with each other. Then, the flow path for the filler metal 131 is formed.

When the filling space 117 in the jig 100 is filled with the filler metal 131, the jig 100 is supported in a state shown in FIG. 11, and a jig support mechanism that presses the flow path forming block 111 toward the metal material 115, a filler metal supply unit that supplies the filler metal to the jig 100 and a temperature control unit that keeps the filling space 117 at a predetermined temperature are used.

Examples of the jig support mechanism, the filler metal supply unit, and the temperature control unit as described above are schematically shown in FIG. 12A and FIG. 12B.

Figure 12A:
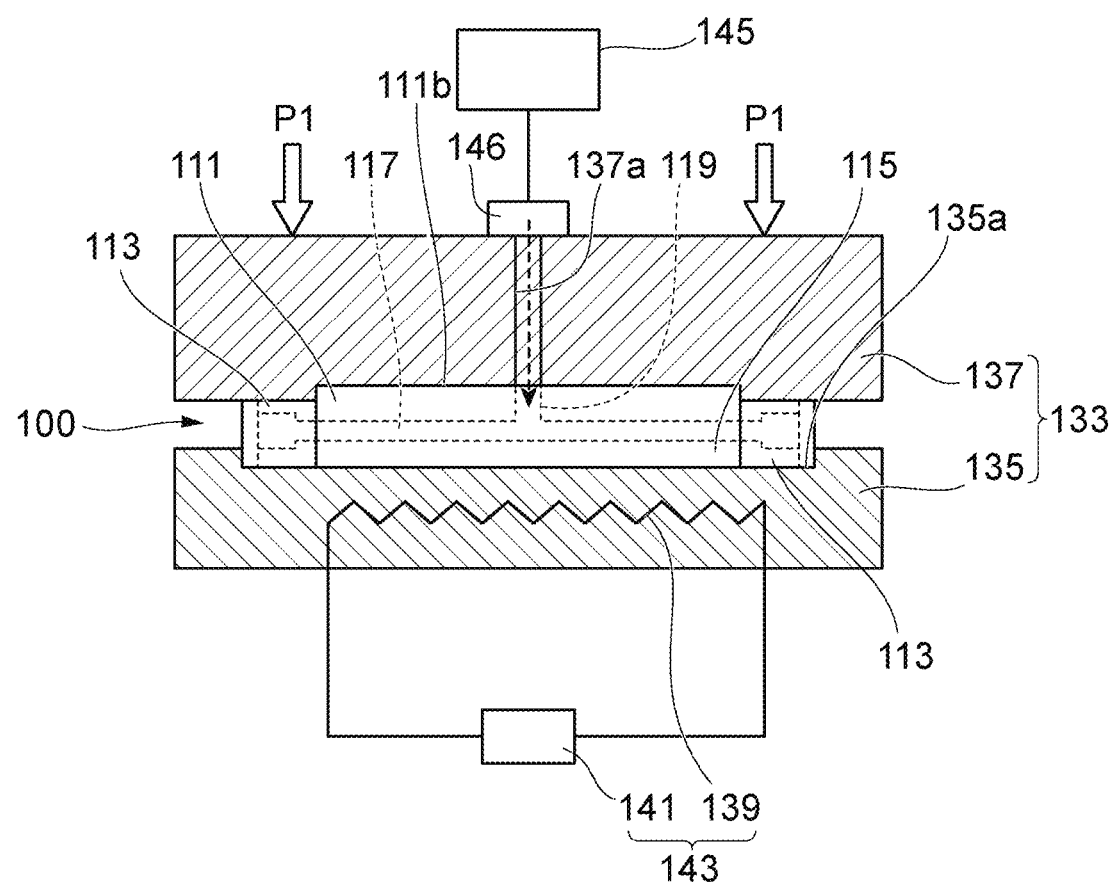
FIG. 12A is an explanatory diagram showing an aspect before the jig is filled with the filler metal.
Figure 12B:
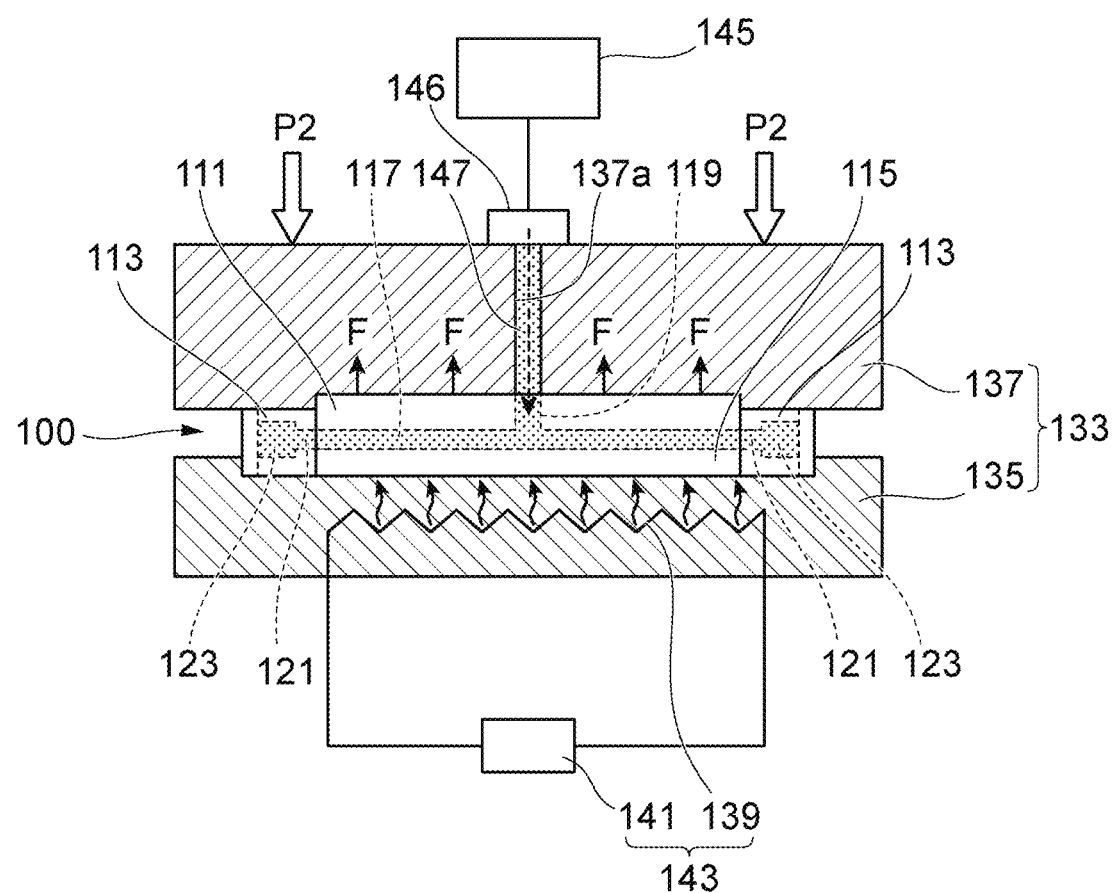
FIG. 12B is an explanatory diagram showing an aspect in which the jig is filled with the filler metal.

FIG. 12A is an explanatory diagram showing an aspect before the jig 100 is filled with the filler metal, and FIG. 12B is an explanatory diagram showing an aspect in which the jig 100 is filled with the filler metal.

As shown in FIG. 12A, the jig support mechanism 133 has a lower mold 135 and an upper mold 137, and the jig 100 is arranged to be sandwiched between the lower mold 135 and the upper mold 137. That is, the jig support mechanism 133 is configured to bring the flow path end blocks 113 and the metal material 115 into close contact with the flow path forming block 111. A receiving concave portion 135a for receiving the jig 100 and the metal material 115 is provided in the lower mold 135, and a heater 139 is embedded at a position in the receiving concave portion 135a, in which the metal material 115 is received. The heater 139 is connected to a temperature controller 141 for controlling a heating temperature. The heater 139 and the temperature controller 141 serves as the temperature control unit 143 configured to control a temperature of the metal material 115 by heating the heater 139.

The upper mold 137 is connected to a drive mechanism (not shown) capable of pressing the flow path forming block 111 and the flow path end blocks 113 towards the lower mold 135 (at a pressure P1). A filler metal supply flow path 137a that supplies a filler metal to the inlet 119 of the flow path forming block 111 is provided in the upper mold 137 in communication with the inlet 119 of the flow path forming block 111. A molten filler metal (molten metal) is supplied from the filler metal supply unit 145 to the filler metal supply flow path 137a.

When a filler metal is supplied to the jig 100, as shown in FIG. 12B, a molten metal 147 of the filler metal supplied under pressure from the filler metal supply unit 145 is sprayed into the filler metal supply flow path 137a through a nozzle unit 146 having orifices or the like. For the sprayed molten metal 147, droplets as described above first moves ahead in the flow path and then reaches the filling space 117 through the inlet 119 of the flow path forming block 111. Thereafter, the molten metal 147 moves through the flow path and reaches the filling space 117 through the inlet 119. The nozzle unit 146 may be provided in the inlet 119 of the flow path forming block 111, instead of the upper mold 137. In this case, the molten metal 147 is directly sprayed into the inlet 119, and the droplets and the molten metal 147 are strongly supplied to the filling space 117.

The droplets and the molten metal 147 as a fluid flowing from the inlet 119 into the filling space 117 flow through the filling space 117 in this order, and the head of the flow is discharged to the retention portion 123 through the connection flow path 121.

When the molten metal 147 is supplied to the filling space 117, the temperature controller 141 has already heated the heater 139. For example, the heater 139 is heated to keep the metal material 115 in a heated state of 400° C. to 500° C. This heating set temperature is a temperature lower than melting points of the metal material 115 and the filler metal 131 and may be a temperature suitable for solid-phase diffusion bonding of both. In a case where the metal material 115 or the filler metal 131 is a material of 1000 series (melting point of about 640° C.), 3000 series (melting point of about 630° C.), 5000 series (melting point of about 600° C.) or 6000 series (melting point of about 580° C.), the upper limit of the heating set temperature may be 530° C. or 550° C.

When the melt droplets and the molten metal 147 of the filler metal flow into the filling space 117 through the inlet 119, the droplets and the molten metal 147 flowing within the filling space 117 spread, in this order, inside the filling space 117 radially about the inlet 119 and flow toward a space outer edge 117a. Then, such a fluid flows into the retention portion 123 from the space outer edge 117a of the filling space 117 through the connection flow path 121 of the flow path end blocks 113.

Here, the molten metal 147 (and droplets) supplied to the filling space 117 at the beginning of flowing may contain foreign substances or impurities, such as air, oxides, and organic substances. Since the molten metal 147 (and droplets) continuously flows from the space outer edge 117a of the filling space 117 to the retention portion 123, the foreign substances and impurities are discharged to the retention portion 123 without remaining in the filling space 117. Since the molten metal 147 of the filler metal 131 continuously flows toward the retention portion 123, the molten metal 147 can flow without remaining in the filling space 117. Therefore, the filler metal 131 formed by solidifying the molten metal 147 has an enhanced quality and thus a reduced porosity.

When the filling space 117 is filled with the molten metal 147, a reaction force F acting from the flow path forming block 111 toward the upper mold 137 is generated by a pressure of the molten metal 147. As a result, a pressure which is exerted on the jig 100 from the upper mold 137 becomes a pressure P2 greater than a pressure P1 before filling with the filler metal. In a case where the metal material is an aluminum alloy and the filler metal is an aluminum alloy, the pressure P2 is set, for example, to a range of 260 MPa to 280 MPa.

After the filling space 117 is filled with the molten metal 147 of the filler metal 131 as described above, the molten metal 147 is pressurized at a predetermined pressure and held for at least 10 seconds, preferably for 20 seconds or more, and also a temperature of the metal material 115 is kept at a predetermined temperature lower than the melting point thereof. Then, a joined body in which the filler metal 131 is solid-phase diffusion bonded to the upper surface 115a of the metal material 115 is obtained.

Figure 13:
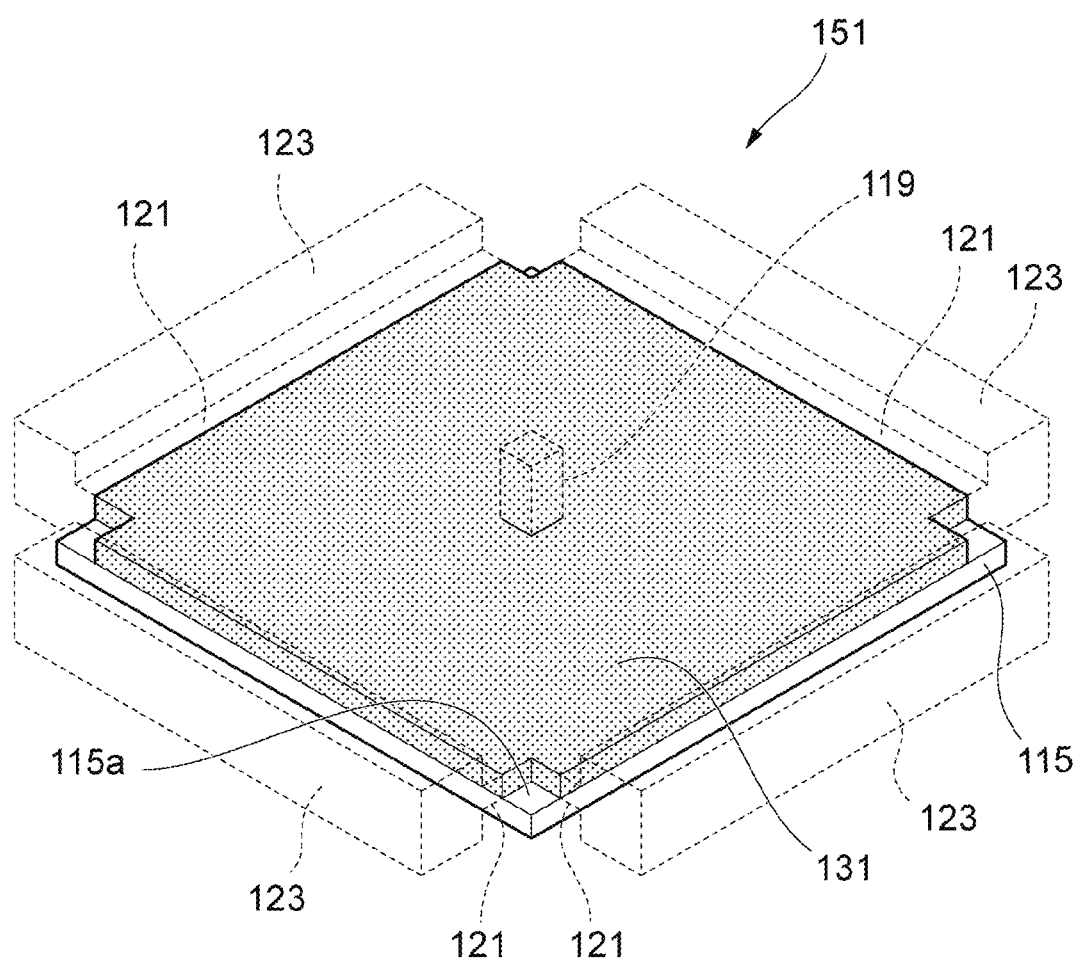
FIG. 13 is a perspective view of a joined body in which a metal material and a filler metal are joined with each other.

FIG. 13 is a perspective view of a joined body 151 in which the metal material 115 and the filler metal 131 are joined with each other. In FIG. 13, the inlet 119, the connection flow path 121 and the retention portion 123, which are unnecessary as a product and thus are to be cut out, are shown by dotted lines. In the joined body 151, the filler metal 131 has been solid-phase diffusion bonded to the upper surface 115a of the metal material 115 over a wide range.

After a part of the molten metal 147 overflows from the filling space 117 and flows into the retention portion 123 and the filling space 117 is filled with the remaining molten metal 147, supplying of the molten metal from the filler metal supply unit 145 shown in FIG. 12B is ended. Heating/warming of the heater 139 by the temperature control unit 143 is also stopped. Then, once the molten metal 147 in the filling space 117 is cooled and solidified, the lower mold 135 and the upper mold 137 are separated from each other and the joined body 151 in which the metal material 115 and the filler metal 131 are solid-phase diffusion bonded is taken out. By removing the connection flow path 121 and the retention portion 123 from the joined body 151, the joined body 151 having an external shape shown in FIG. 13 is obtained.

As described above, the metal material 115 and the filler metal 131 can be solid-phase diffusion bonded with each other by arranging the metal material 115 in the filling space 117 such that the to-be-joined surface of the metal material 115 is exposed, spraying the molten metal 147 of the filler metal 131 into the filling space 117 to form a fresh surface in the to-be-joined surface of the metal material 115, covering the formed fresh surface with the molten metal 147 of the filler metal 131 and then pressurizing them for a predetermined time.

Further, when the molten metal 147 is poured into the filling space 117, the lower mold 135 is heated and warmed by the heater 139 shown in FIG. 12B, and in this case, even in a case where a reduced thickness portion having, for example, a thickness of 3 mm or less is formed by the filler metal 131, it is possible to allow the molten metal 147 to flow smoothly in the reduced thickness portion. That is, a situation in which the molten metal 147 solidifies in a narrow portion of the filling space 117 and the flow of the molten metal 147 is stopped, or a situation in which the flow of the molten metal 147 is stagnated due to an increase in viscosity of the molten metal 147 caused by a temperature drop, can be prevented. Therefore, it is possible to form a filler metal part constituting a part of the joined body without generating underfill and also to obtain a high quality of the filler metal part in which there is substantially no blowholes and the like. Further, even in a case where the joined body 151 has a complicated shape, the filler metal part can be formed by a good flow of the molten metal 147, thereby preventing the manufacturing process thereof from being complicated. Therefore, the joined body, which is obtained by solid-phase diffusion bonding and has high joining strength and rigidity, can be manufactured at low cost.

Further, a part of the molten metal 147 overflowing from the filling space 117 is discharged to the retention portion 123, thereby allowing the molten metal 147 to smoothly flow in the filling space 117. Therefore, pooling of the molten metal 147 is prevented and the filler metal 131 after solidification becomes homogeneous. In addition, when the connection flow paths 121 are provided to have a wide width along each side of the metal material 115, it is possible to allow the molten metal to well flow over a wide range of the filling space 117, thereby giving the filler metal part after solidification to have a high quality over a wide range thereof.

Also, embossing may be performed on a lower surface 111a of the flow path forming block 111 shown in FIG. 11 in order to physically form a wrinkle pattern (embossed pattern) thereon. By embossing the lower surface 111a of the flow path forming block 111 defining the filling space 117, fluidity of the molten metal can be enhanced.

Eighth Joining Embodiment

Next, a configuration example of a joined body formed by a method of solid-phase diffusion bonding between a metal material and a filler metal as described above is described.

Figure 14:
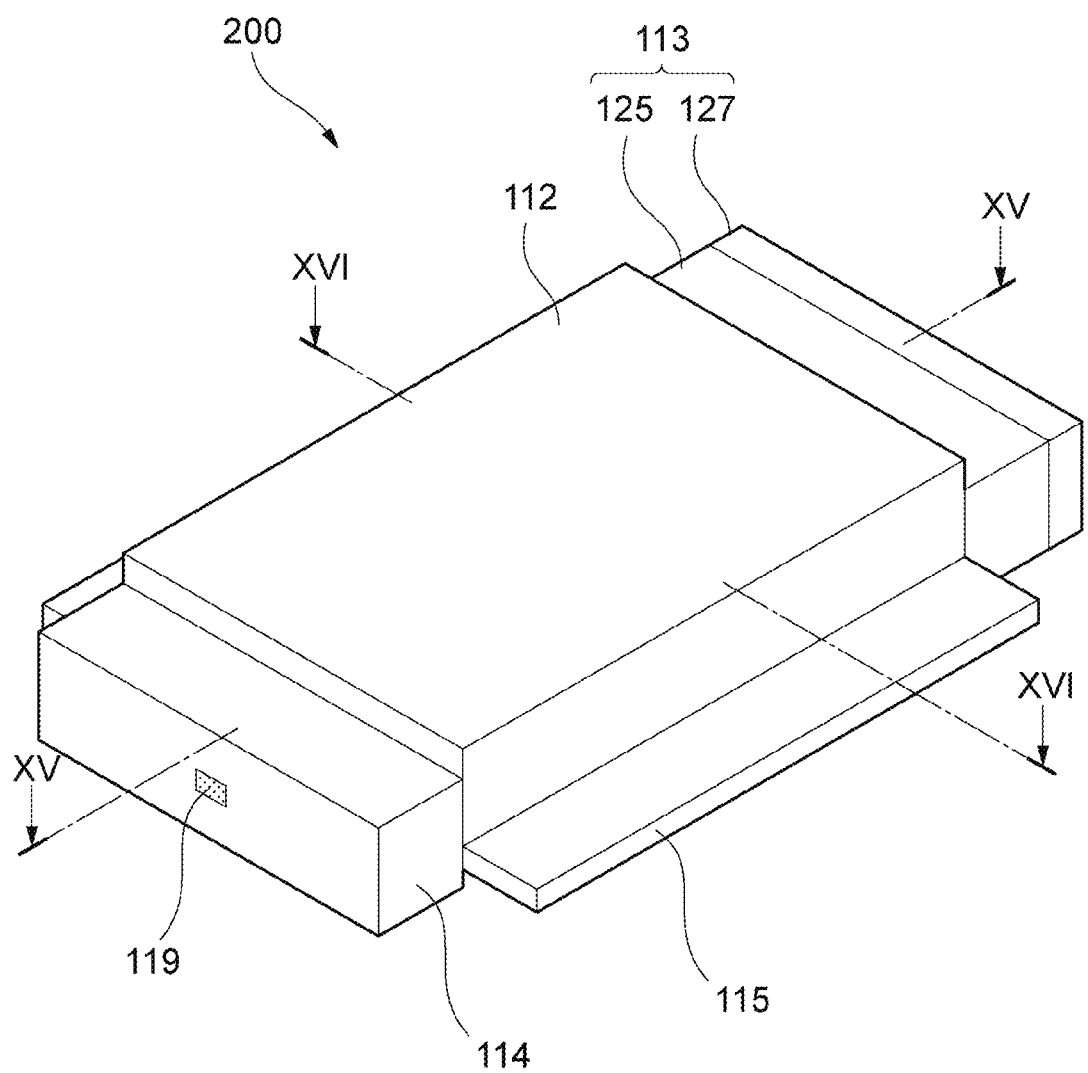
FIG. 14 is a schematic perspective view of a main part of a jig for forming a joined body in the eighth joining embodiment.
Figure 15:
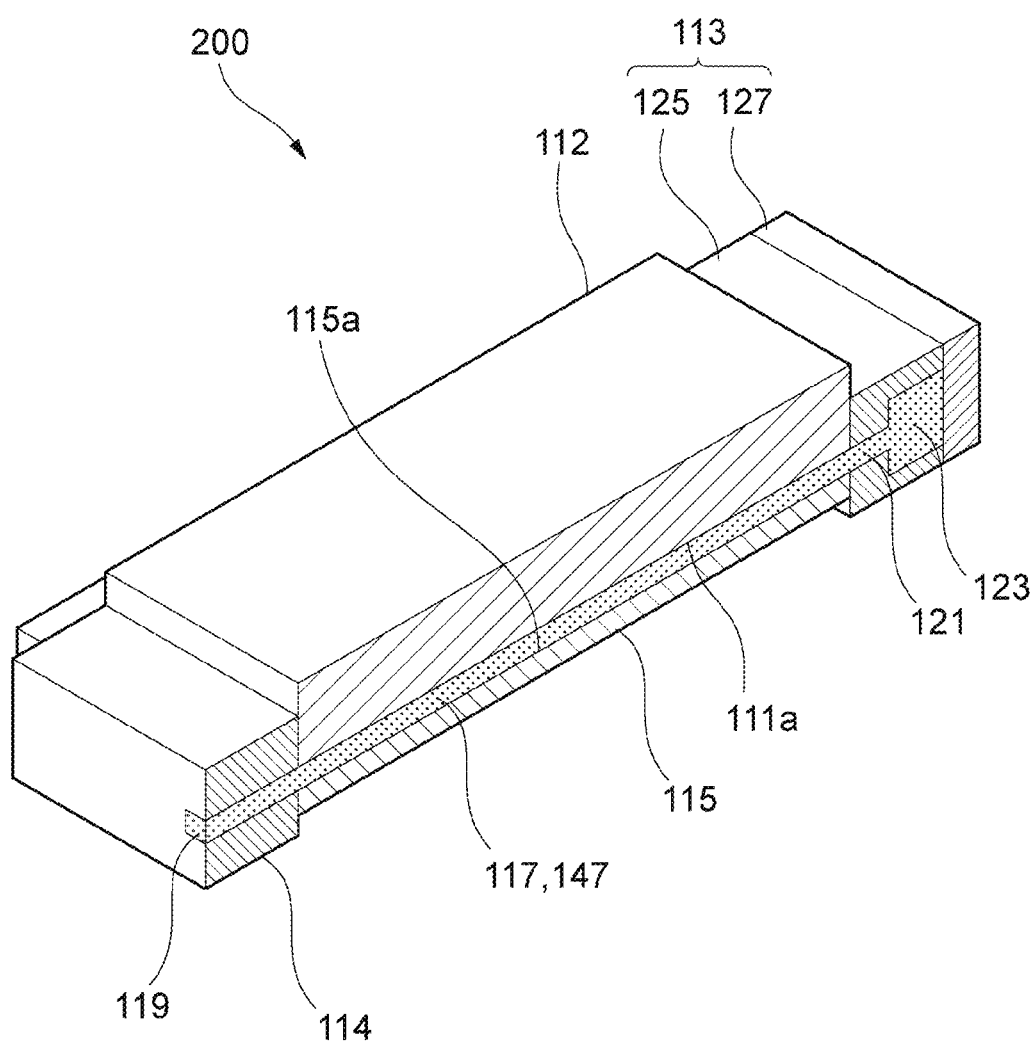
FIG. 15 is a partial sectional perspective view of the jig taken along a line XV-XV in FIG. 14.
Figure 16:
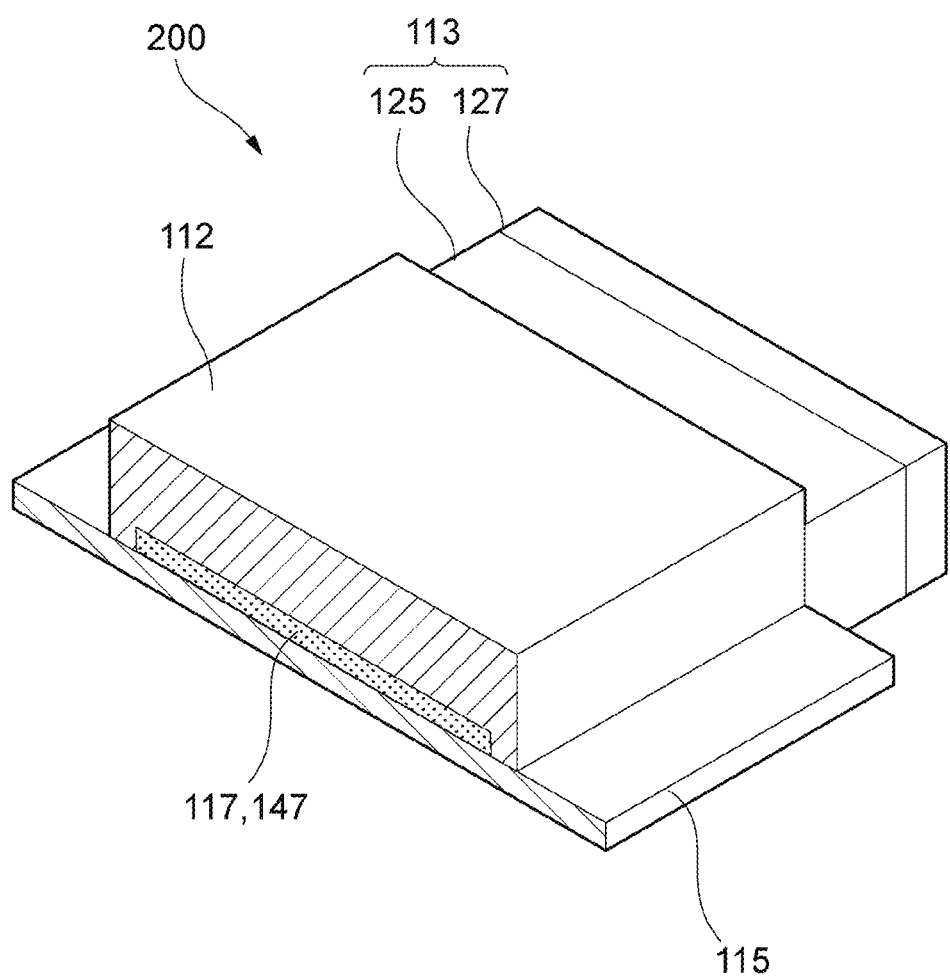
FIG. 16 is a partial sectional perspective view of the jig taken along a line XVI-XVI in FIG. 14.

FIG. 14 is a schematic perspective view of a main part of a jig 200 for forming a joined body in the eighth joining embodiment. FIG. 15 is a partial sectional perspective view of the jig 200 taken along a line XV-XV in FIG. 14. FIG. 16 is a partial sectional perspective view of the jig 200 taken along a line XVI-XVI in FIG. 14.

As shown in FIG. 14 to FIG. 16, the jig 200 includes a flow path forming block 112 and flow path end blocks 113, 114 connected to both ends of the flow path forming block 112 in one axial direction thereof.

The flow path forming block 112 is arranged to face the metal material 115 and defines a filling space 117 between an upper surface 115a of the metal material 115 and a lower surface 111a of the flow path forming block 112. The filling space 117 in this configuration is formed in a flat shape between one flow path end block 114 and the other flow path end block 113, thereby ensuring a large joining area with the metal material 115.

A flow path communicating with the filling space 117 of the flow path forming block 112 is provided in the flow path end block 114 having an inlet 119, and the connection flow path 121 and the retention portion 123 as described above are provided in the flow path end block 113.

In the jig 200 in the above configuration, a molten metal of the filler metal is supplied along a plate face of the metal material 115, like the first configuration example. Therefore, a fresh surface is formed in a to-be-joined surface of the metal material 115 exposed to the filling space 117. Immediately thereafter, the molten metal of the filler metal flows onto the fresh surface and covers the fresh surface. Therefore, a joined body in which the metal material 115 and the filler metal are solid-phase diffusion bonded is obtained.

In addition, although the filling space 117 in this configuration is a flat space, the present invention is not limited thereto. The filling space 117 may have any shapes, such as a space including a bent portion or curved portion, and a multi-partitioned space.

Ninth Joining Embodiment

Next, a configuration example of a joined body formed by a method of solid-phase diffusion bonding between a metal material and a filler metal as described above is described.

Figure 17:
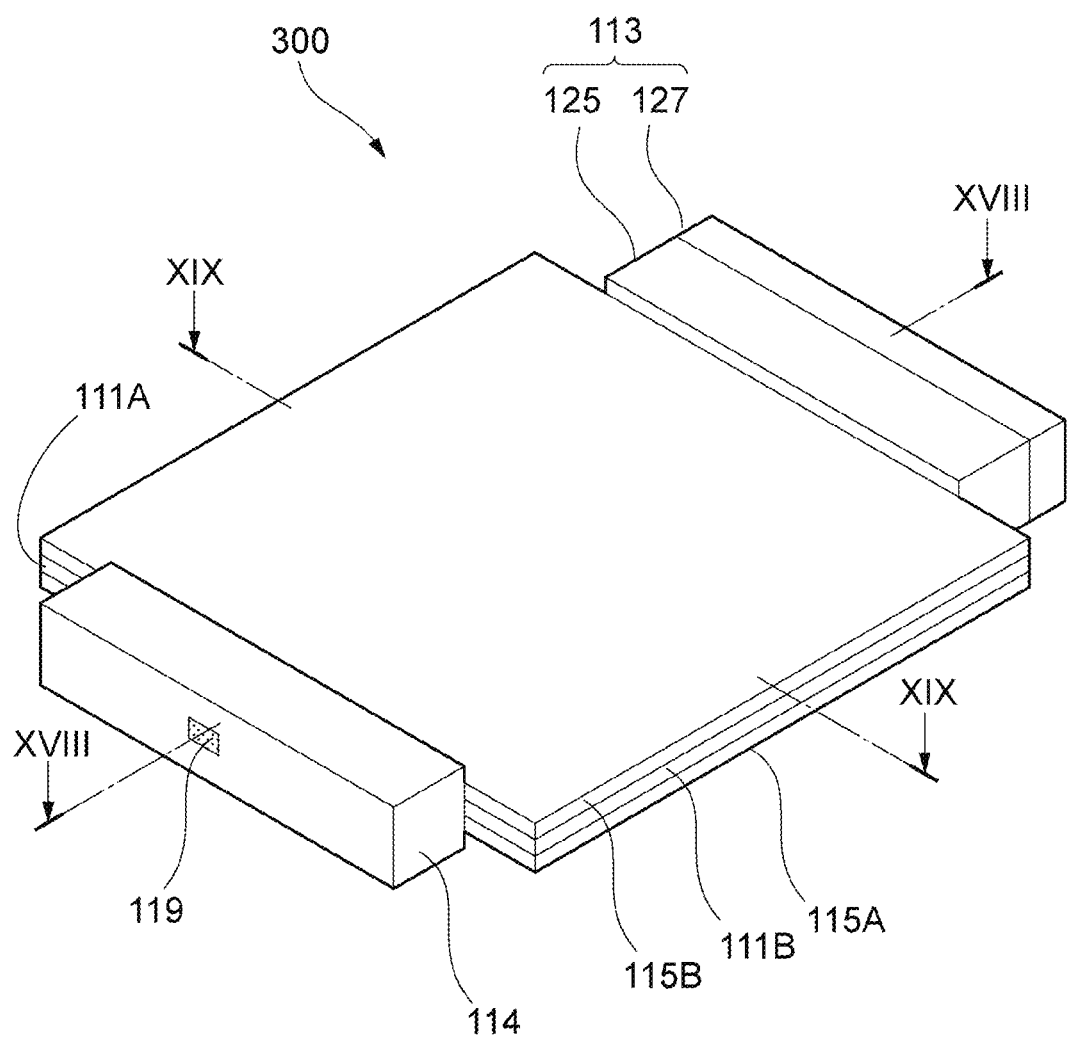
FIG. 17 is a schematic perspective view of a main part of a jig for forming a joined body in the ninth joining embodiment.
Figure 18:
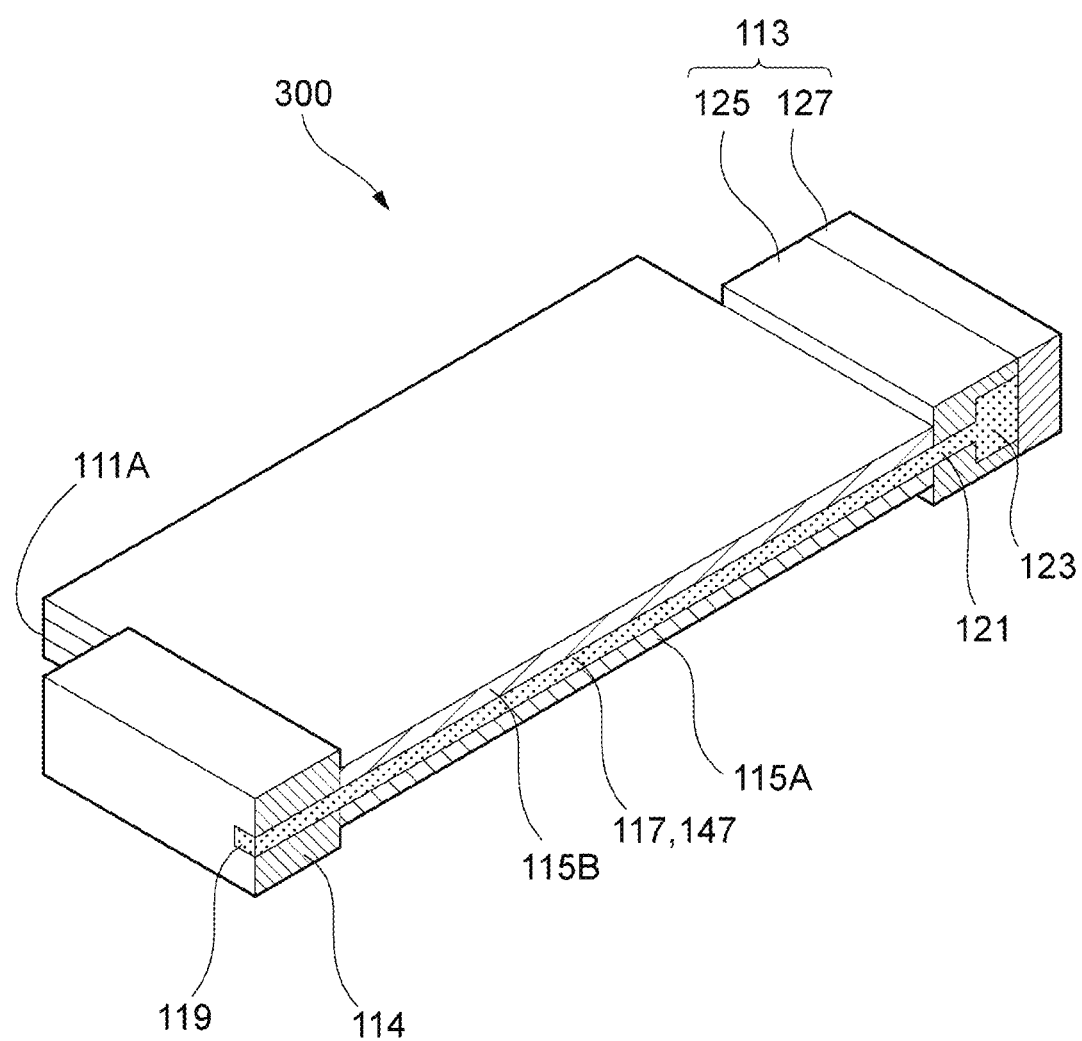
FIG. 18 is a partial sectional perspective view of the jig taken along a line XVIII-XVIII in FIG. 17.
Figure 19:
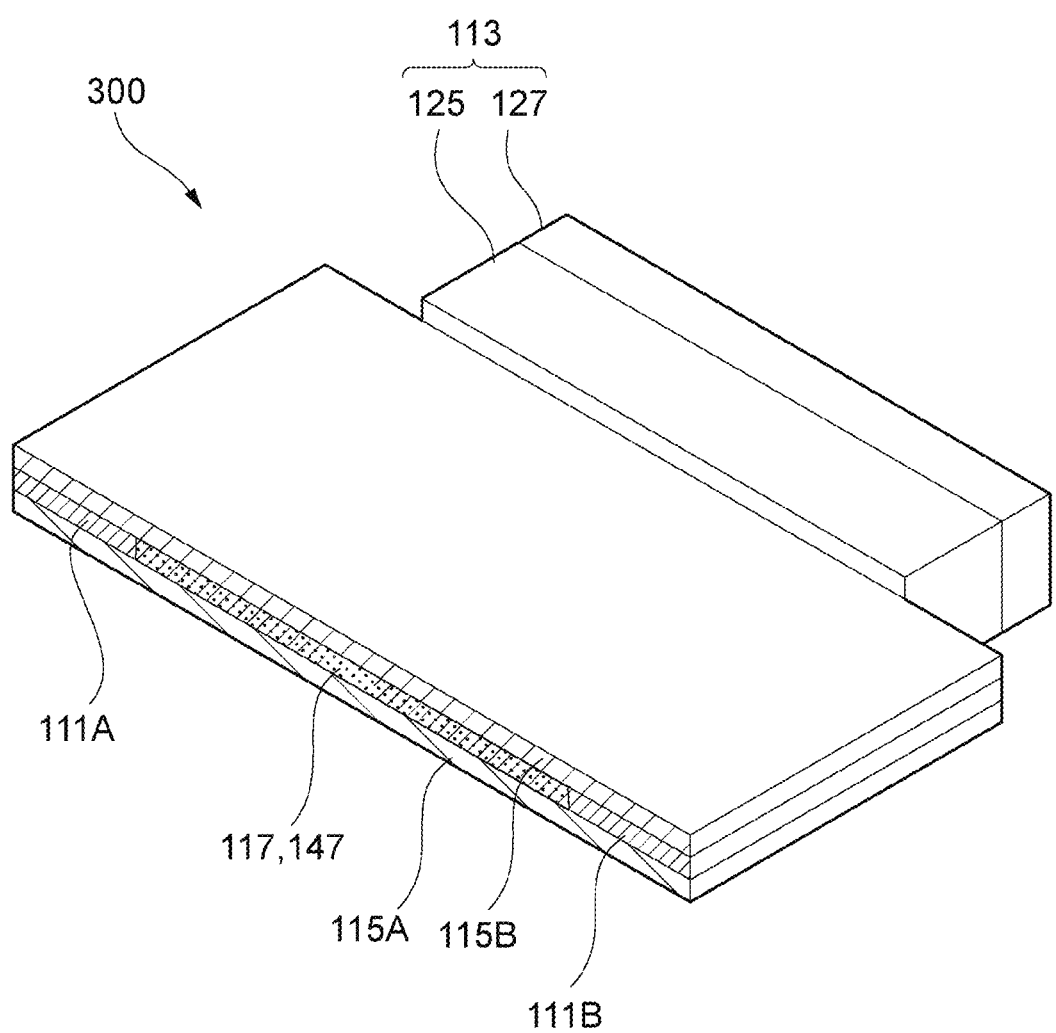
FIG. 19 is a partial sectional perspective view of the jig taken along a line XIX-XIX in FIG. 17.
Figure 20:
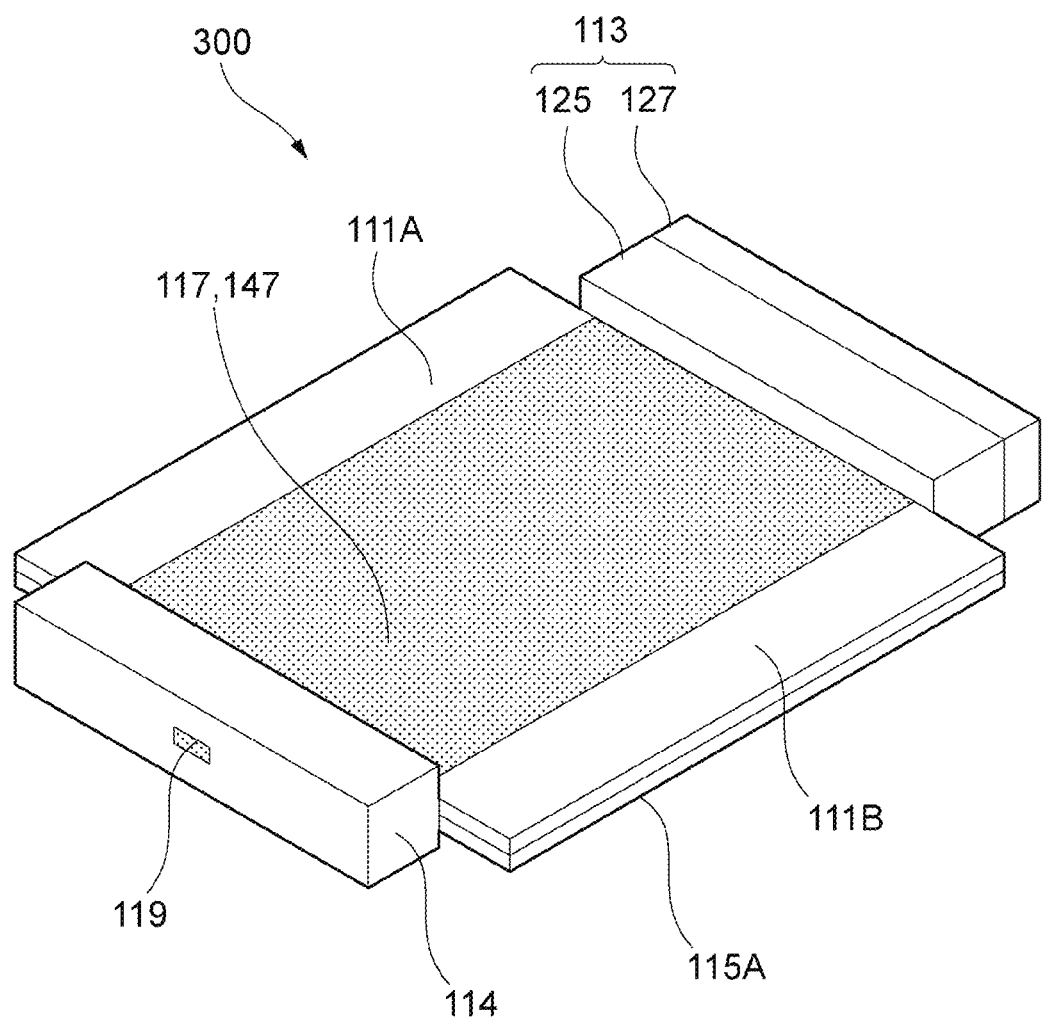
FIG. 20 is a schematic perspective view of a jig in a state where a metal material on the upper side in FIG. 17 has been removed.

FIG. 17 is a schematic perspective view of a main part of a jig 300 for forming a joined body in the ninth joining embodiment. FIG. 18 is a partial sectional perspective view of the jig 300 taken along a line XVIII-XVIII in FIG. 17. FIG. 19 is a partial sectional perspective view of the jig 300 taken along a line XIX-XIX in FIG. 17. FIG. 20 is a schematic perspective view of the jig 300 in a state where a metal material 115B on the upper side in FIG. 17 has been removed.

As shown in FIG. 17 to FIG. 20, the jig 300 includes flow path forming blocks 111A, 111B and flow path end blocks 113, 114 connected to both ends of the flow path forming blocks 111A, 111B in one axial direction thereof.

The jig 300 defines a filling space 117 between a pair of upper and lower plate-shaped metal materials 115A, 115B. The pair of metal materials 115A, 115B overlap in a plate thickness direction with a predetermined distance therebetween, and a pair of plate-shaped flow path forming blocks 111A, 111B are arranged between the metal material 115A and the metal material 115B. The flow path forming blocks 111A, 111B are arranged such that side surfaces thereof face each other in the horizontal direction. A flat space surrounded by an upper surface of the metal material 115A, a lower surface of the metal material 115B and the side surfaces of the flow path forming blocks 111A, 111B is the filling space 117.

In the jig 300 in this configuration, a joined body in which the pair of metal materials 115A and 115B is solid-phase diffusion bonded via a filler metal is obtained. In addition, also in the case of this configuration, the filling space 117 may have any shapes.

EXAMPLES

Next, the result obtained by observing the joining interface of the joined body in the above first configuration example, which is obtained by solid-phase diffusion bonding between the metal material and the filler metal, is described.

Figure 21:
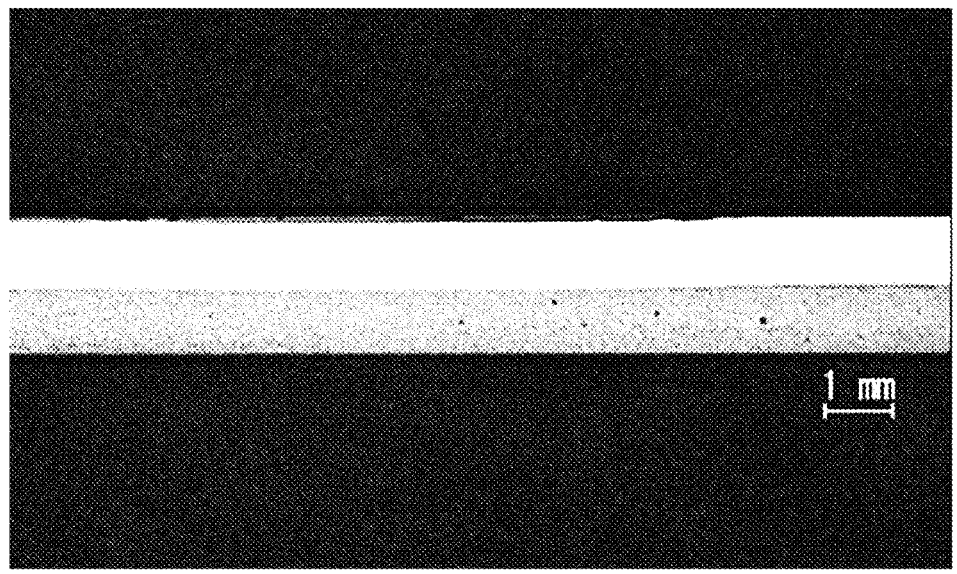
FIG. 21 is a photomicrograph showing a cross section of a joined body obtained by solid diffusion bonding between a metal material and a filler metal.

FIG. 21 is a photomicrograph showing a cross section of a joined body obtained by solid-diffusion-bonding between a metal material (6000 series aluminum alloy plate) and a filler metal (ADC12).

As shown in FIG. 21, at an interface between the metal material arranged on the upper side and the filler metal arranged on the lower side, the metal material and the filler metal are solid-phase diffusion bonded each other.

Thus, the present invention is not limited to the foregoing embodiments, and combining the features of each of the embodiments with each other or modifying or applying the features by those skilled in the art based on the description and common techniques is intended to be included in a plan of the present invention and to be encompassed by the scope thereof.

Although supplying the molten metal to the filling space under atmospheric pressure is illustrated in the above examples, supplying the molten metal to the filling space under vacuum or reduced pressure may be employed. In addition, supplying the molten metal to the filling space after the filling space is filled with an inert gas and before supplying the molten metal may be employed. In these cases, it is possible to more reliably prevent an oxide film from being formed on the fresh surface.

As described above, the following configurations are disclosed in this description.

(1) A method for joining an aluminum material, comprising, in the following order, the steps of:
arranging a first wrought aluminum alloy material along a first jig in an internal space defined between the first jig and a second jig that is arranged to face the first jig and has a pouring port;
pouring molten aluminum toward the first wrought aluminum alloy material through the pouring port under pressure to cause the molten aluminum to collide with a surface of the first wrought aluminum alloy material, thereby digging down the first wrought aluminum alloy material at a collision position between the molten aluminum and the first wrought aluminum alloy material; and
flowing the molten aluminum together with a fraction of the first wrought aluminum alloy material removed by digging within the internal space along a surface of the first wrought aluminum alloy material around the collision position.

According to this method for joining aluminum material, it is possible to instantly perform joining between the first wrought aluminum alloy material and the aluminum cast by supplying the molten aluminum and also to enhance a joining strength therebetween.

(2) The method for joining an aluminum material according to (1), wherein the first wrought aluminum alloy material is dug down to such a depth as not to penetrate the first wrought aluminum alloy material at the collision position.

According to this method for joining aluminum material, a protrusion is formed in the wrought aluminum alloy material by the aluminum cast. Therefore, it is possible to obtain an increased joining area between the protrusion and the wrought aluminum alloy material and thus to enhance the joining strength.

(3) The method for joining an aluminum material according to (1), wherein the first wrought aluminum alloy material is penetrated by collision of the molten aluminum at the collision position.

According to this method for joining aluminum material, a protrusion is formed over the entire thickness of the first wrought aluminum alloy material by the aluminum cast. Therefore, it is possible to further enhance the joining strength between the wrought aluminum alloy material and the aluminum cast.

(4) The method for joining an aluminum material according to (3), wherein the first jig has a recessed portion that is positioned at a position facing the pouring port formed in the second jig and has an opening area larger than an opening area of the pouring port, and the recessed portion is filled with the molten aluminum flowing from a runner formed by penetration of the first wrought aluminum alloy material.

According to this method for joining aluminum material, after solidification of the molten aluminum, a clamping portion that clamps the wrought aluminum alloy material in a thickness direction thereof is formed in the recessed portion filled with the molten aluminum. Since the wrought aluminum alloy material is clamped by the clamping portion, the joining strength between the wrought aluminum alloy material and the aluminum cast can be enhanced.

(5) The method for joining an aluminum material according to (4), wherein a plurality of the pouring ports is provided in the second jig, the recessed portions are provided in the first jig at positions facing the pouring ports, respectively, and each of the recessed portions is filled with the molten aluminum.

According to this method for joining aluminum material, at a plurality of positions, the aluminum cast can pass through the first wrought aluminum alloy material and reach the recessed portions, thereby further enhancing the joining strength between the first wrought aluminum alloy material and the aluminum cast. In addition, since a larger number of pouring ports and recessed portions are provided at positions where a strength is required than those in the surrounding, the joining strength in the positions can be enhanced.

(6) The method for joining an aluminum material according to any one of (1) to (5), wherein the step of arranging the first wrought aluminum alloy material further comprises arranging a second wrought aluminum alloy material having a cutout or through-hole along the second jig such that the pouring port is exposed to the internal space through the cutout or through-hole and the second wrought aluminum alloy material is spaced apart from the first wrought aluminum alloy material.

According to this method for joining aluminum material, the aluminum cast is formed between inner surfaces of the first and second wrought aluminum alloy materials, thereby enhancing a joining strength between the first and second wrought aluminum alloy materials.

(7) The method for joining an aluminum material according to (1), wherein the first wrought aluminum alloy material has a flat plate shape.

According to this method for joining aluminum material, it is possible to join a flat plate-shaped wrought aluminum alloy material to the aluminum cast with high strength.

(8) The method for joining an aluminum material according to (1), wherein the first wrought aluminum alloy material has a tubular shape.

According to this method for joining aluminum material, it is possible to join a tubular wrought aluminum alloy material to the aluminum cast with high strength.

(9) A method for joining an aluminum material, comprising, in the following order, the steps of:

arranging a first wrought aluminum alloy material along a first jig in an internal space defined between the first jig and a second jig that is arranged to face the first jig and has a pouring port, and arranging a second wrought aluminum alloy material along the second jig in the internal space such that the second wrought aluminum alloy material is spaced apart from the first wrought aluminum alloy material;

pouring molten aluminum toward the internal space through the pouring port under pressure to form a through-hole in the second wrought aluminum alloy material;

pouring the molten aluminum into the internal space through the through-hole under pressure to cause the molten aluminum to collide with a surface of the first wrought aluminum alloy material, thereby digging down the first wrought aluminum alloy material at a collision position between the molten aluminum and the first wrought aluminum alloy material; and flowing the molten aluminum together with a fraction of the first wrought aluminum alloy material removed by digging within the internal space along surfaces of the first and second wrought aluminum alloy materials around the collision position.

According to this method for joining aluminum material, the molten aluminum can be poured into a gap between the first and second wrought aluminum alloy materials through the through-hole formed in the second wrought aluminum alloy material, thereby allowing the first and second wrought aluminum alloy materials to be instantly joined with each other with high strength.

(10) The method for joining an aluminum material according to (9), wherein the first jig has a recessed portion that is positioned at a position facing the pouring port formed in the second jig and has an opening area larger than an opening area of the pouring port, and the recessed portion is filled with the molten aluminum flowing from a runner formed by penetration of the first wrought aluminum alloy material.

According to this method for joining aluminum material, after solidification of the molten aluminum, a clamping portion that clamps the wrought aluminum alloy materials in a thickness direction thereof is formed in the recessed portion filled with the molten aluminum. Since the wrought aluminum alloy materials are clamped by the clamping portion, the joining strength between the wrought aluminum alloy materials and the aluminum cast can be enhanced.

(11) The method for joining an aluminum material according to (10),
wherein a plurality of the pouring ports is provided in the second jig,
the recessed portions are provided in the first jig at positions facing the pouring ports, respectively, and
each of the recessed portions is filled with the molten aluminum.

According to this method for joining aluminum material, at a plurality of positions, the aluminum cast can pass through the first wrought aluminum alloy material and reach the recessed portions, thereby further enhancing the joining strength between the first wrought aluminum alloy material and the aluminum cast. Also, since an arrangement density of pouring ports and recessed portions is locally increased, the joining strength can be further enhanced. Therefore, it is possible to easily increase a joining strength at the position where a strength is especially required, as compared with the surroundings.

(12) The method for joining an aluminum material according to any one of (9) to (11),
wherein each of the first and second wrought aluminum alloy materials has a flat plate shape.

According to this method for joining aluminum material, it is possible to join flat plate-shaped wrought aluminum alloy materials to the aluminum cast with high strength.

(13) The method for joining an aluminum material according to any one of (9) to (11),
wherein the first and second wrought aluminum alloy materials have a tubular shape, and the tubular shape of the first wrought aluminum alloy material is different in diameter dimension from that of the second wrought aluminum alloy material.

According to this method for joining aluminum material, it is possible to join tubular wrought aluminum alloy materials to the aluminum cast with high strength.

(14) A method for joining an aluminum material, comprising joining a metal material made of a wrought aluminum alloy material and a filler metal made of an aluminum cast,
the method comprising the steps of:
arranging the metal material in a flow path formed in a jig made of a material having a melting point higher than those of the metal material and the filler metal such that a to-be-joined surface of the metal material is exposed to the flow path;
spraying a molten metal of the filler metal into the flow path to form droplets of the filler metal;
forming a fresh surface in the to-be-joined surface by causing fine particles formed by cooling and solidifying the droplets in the flow path to collide with the to-be-joined surface;
covering the fresh surface with a molten metal of the filler metal after the fresh surface is formed and before an oxide film is formed thereon; and
pressurizing the molten metal in the flow path while keeping the molten metal at a solid-phase diffusion bonding temperature, thereby solid-phase diffusion bonding the fresh surface and the filler metal.

According to this method for joining aluminum material, fine particles obtained by solidifying melt droplets collide with the metal material, thereby scraping off a surface layer of the metal material to form a fresh surface. Thereafter, before an oxide film is formed on the fresh surface, the fresh surface is covered with the filler metal, thereby allowing the metal material and the filler metal to be solid-phase diffusion bonded with each other by solidification of the molten metal. Therefore, it is possible to enhance a joining strength of the joining portion without reducing workability, and to obtain a high-strength joined body in which a wrought aluminum alloy material and an aluminum alloy cast are solid-phase diffusion bonded.

(15) The method for joining an aluminum material according to (14),
wherein a retention portion configured to receive a fluid that includes at least the fine particles and molten metal and overflows from the flow path is connected to the flow path on a downstream side in a flowing direction of the fluid.

According to this method for joining aluminum material, a fluid containing a lot of impurities and foreign substances at the beginning of flowing is discharged to the retention portion. Therefore, it is possible to reduce a porosity of the filler metal being a solidified molten metal can be reduced, thereby enhancing the quality of the joined body.

(16) The method for joining an aluminum material according to (14),
wherein a cross-sectional area of the flow path is reduced by the metal material arranged in the flow path to increase a flow velocity of the fine particles.

According to this method for joining aluminum material, the cross-sectional area of the flow path is reduced by the metal material arranged in the flow path, thereby increasing the flow velocity of the fine particles flowing in the flow path. Therefore, the fine particles can collide with the metal material at a higher speed, thereby forming the fresh surface in a short time with high efficiency.

(17) The method for joining an aluminum material according to any one of (14) to (16),
wherein a plurality of the metal materials are arranged to face each other, and the flow path is formed between facing surfaces of the metal materials facing each other.

According to this method for joining aluminum material, the facing surfaces of the metal materials are diffusion-bonded with high strength via the filler metal.

(18) The method for joining an aluminum material according to (17), wherein the metal materials have a flat plate shape, and the flow path is formed by overlapping the metal materials in a thickness direction thereof.

According to this method for joining aluminum material, the metal materials are diffusion-bonded with high strength via the filler metal in a state where the metal materials overlap each other in the plate thickness direction.

(19) The method for joining an aluminum material according to (14),
wherein each of the metal material and the filler metal is a 5000 series aluminum alloy.

According to this method for joining aluminum material, even in the case of 5000 series aluminum alloy which is difficult to be joined, atoms are well diffused and thus a high joining strength is obtained.

This application is based on Japanese Patent Application No. 2019-111896 filed on Jun. 17, 2019, and Japanese Patent Application No. 2019-195190 filed on Oct. 28, 2019, the contents of which are incorporated herein by reference.

REFERENCE SIGNS LIST

10 Jig
11, 11A, 11B First jig
13, 13A Second jig
15, 65 First wrought aluminum alloy material
15a Outer surface
151 inner surface (surface)
17 Molten Aluminum
19 Gap
21 Pouring port
31 Reduced thickness portion of wrought aluminum alloy material
33 Aluminum cast
35 Protrusion
37 Surface layer
41 Melt droplet
43 Fine particle
45 Fresh surface
51 Recessed portion
53 Clamping portion
63a Outer surface
631 Inner surface
63c Through-hole
63d Prepared hole
63, 63A, 67 Second wrought aluminum alloy material
65a Inner peripheral surface
65b Outer peripheral surface (surface)
67b Through-hole
71 Core (first jig)
79 Cylindrical split mold (second jig)
100, 200, 300 Jig
111, 111A, 112 Flow path forming block
111a Lower surface
111b Upper surface
113, 114 Flow path end block
115, 115A, 115B Metal material
117 Filling space
117a Space outer edge
119 Inlet
121 Connection flow path
123 Retention portion
175 Grooved member
127 Retaining member
131 Filler metal
133 Jig support mechanism
135 Lower mold
135a Receiving concave portion
137 Upper mold
137a Filler metal supply flow path
139 Heater
141 Temperature controller
143 Temperature control unit
145 Filler metal supply unit
146 Nozzle unit
147 Molten metal (filler metal)
151 Joined body

The invention claimed is:

1. A method for joining an aluminum material, the method comprising, in the following order:

arranging a first wrought aluminum alloy material along a first jig in an internal space between the first jig and a second jig that is arranged to face the first jig and has a molten aluminum introduction port;

introducing molten aluminum toward the first wrought aluminum alloy material through the introduction port under pressure to cause the molten aluminum to collide with an inner surface, facing the internal space, of the first wrought aluminum alloy material, thereby removing a fraction of the first wrought aluminum alloy material at a collision position between the molten aluminum and the inner surfaces of the first wrought aluminum alloy material to form a reduced thickness portion on the inner surface of the first wrought aluminum alloy material around the collision portion; and flowing the molten aluminum together with a fraction of the first wrought aluminum alloy material removed around the collision position within the internal space along the inner surface of the first wrought aluminum alloy material.

2. The method for joining an aluminum material according to claim 1, wherein the first wrought aluminum alloy material is removed to such a depth as not to penetrate through the first wrought aluminum alloy material at the collision position.

3. The method for joining an aluminum material according to claim 1, wherein the first wrought aluminum alloy material is penetrated through by collision of the molten aluminum at the collision position.

4. The method for joining an aluminum material according to claim 3, wherein the first jig has a recessed portion that is positioned at a position facing the introduction port formed in the second jig, wherein the recessed portion, has an opening area larger than an opening area of the introduction port, and the recessed portion is filled with the molten aluminum flowing from a runner formed by penetration of the first wrought aluminum alloy material.

5. The method for joining an aluminum material according to claim 4, wherein a plurality of the pouting introduction ports is provided in the second jig, recessed portions are provided in the first jig at positions facing the introduction ports, respectively, and each of the recessed portions is filled with the molten aluminum.

6. The method for joining an aluminum material according to claim 1, wherein the arranging the first wrought aluminum alloy material further comprises arranging a second wrought aluminum alloy material having a cutout or through-hole along the second jig such that the introduction port is exposed to the internal space through the cutout or through-hole and the second wrought aluminum alloy material is spaced apart from the first wrought aluminum alloy material.

7. The method for joining an aluminum material according to claim 1, wherein the first wrought aluminum alloy material has a flat plate shape.

8. The method for joining an aluminum material according to claim 1, wherein the first wrought aluminum alloy material has a tubular shape.

9. A method for joining an aluminum material, comprising, in the following order:

arranging a first wrought aluminum alloy material along a first jig in an internal space between the first jig and a second jig that is arranged to face the first jig and has an introduction port, and arranging a second wrought aluminum alloy material along the second jig in the internal space such that the second wrought aluminum alloy material is spaced apart from the first wrought aluminum alloy material;

introducing molten aluminum toward the internal space through the introduction port under pressure to form a through-hole in the second wrought aluminum alloy material;

introducing the molten aluminum into the internal space through the through-hole under pressure to cause the molten aluminum to collide with an inner surface of the first wrought aluminum alloy material, thereby removing a fraction of the first wrought aluminum alloy material at a collision position between the molten aluminum and the inner surface of the first wrought aluminum alloy material to form a reduced thickness portion on the inner surface of the first wrought aluminum alloy material around the collision portion; and flowing the molten aluminum together with a fraction of the first wrought aluminum alloy material removed around the collision position within the internal space along surfaces of the first and second wrought aluminum alloy materials.

10. The method for joining an aluminum material according to claim 9,
wherein the first jig has a recessed portion that is positioned at a position facing the introduction port formed in the second jig and has an opening area larger than an opening area of the introduction port, and
the recessed portion is filled with the molten aluminum flowing from a runner formed by penetration of the first wrought aluminum alloy material.

11. The method for joining an aluminum material according to claim 10,
wherein a plurality of the introduction ports is provided in the second jig,
recessed portions are provided in the first jig at positions facing the introduction ports, respectively, and
each of the recessed portions is filled swig the molten aluminum.

12. The method for joining an aluminum material according to claim 9,
wherein each of the first and second wrought aluminum alloy materials has a flat plate shape.

13. The method for joining an aluminum material according to claim 9,
wherein the first and second wrought aluminum alloy materials have a tubular shape, and the tubular shape of the first wrought aluminum alloy material is different in diameter dimension from that of the second wrought aluminum alloy material.

* * * * *